US012749267B2

(12) United States Patent
Ling et al.

(10) Patent No.: US 12,749,267 B2
(45) Date of Patent: Sep. 29, 2026

(54) SOFT RASTERIZING METHOD AND APPARATUS, DEVICE, MEDIUM, AND PROGRAM PRODUCT

(71) Applicant: Tencent Technology (Shenzhen) Company Limited, Shenzhen (CN)

(72) Inventors: Fei Ling, Shenzhen (CN); Fei Xia, Shenzhen (CN); Yongxiang Zhang, Shenzhen (CN); Jun Deng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 275 days.

(21) Appl. No.: 18/370,789

(22) Filed: Sep. 20, 2023

(65) Prior Publication Data

US 2024/0020925 A1 Jan. 18, 2024

Related U.S. Application Data

(63) Continuation of application No. PCT/CN2022/135590, filed on Nov. 30, 2022.

(30) Foreign Application Priority Data

Mar. 11, 2022 (CN) ......................... 202210238510.7

(51) Int. Cl.

| | |
|---|---|
| ***G06T 17/10*** | (2006.01) |
| ***G06T 1/60*** | (2006.01) |
| ***G06T 15/30*** | (2011.01) |

(52) U.S. Cl.

CPC ................ *G06T 17/10* (2013.01); *G06T 1/60* (2013.01); *G06T 15/30* (2013.01); *G06T 2210/21* (2013.01)

(58) Field of Classification Search

CPC .......... G06T 17/10; G06T 1/60; G06T 15/30; G06T 2210/21; G06T 11/40; G06T 3/00;

(Continued)

(56) References Cited

U.S. PATENT DOCUMENTS

| | | | | |
|---|---|---|---|---|
| 10,037,621 | B2 * | 7/2018 | Surti | ..................... G06T 15/005 |
| 2022/0012842 | A1 | 1/2022 | Zhang et al. | |

FOREIGN PATENT DOCUMENTS

| | | | |
|---|---|---|---|
| CN | 112933599 | A | 6/2012 |
| CN | 102915563 | A | 2/2013 |

(Continued)

OTHER PUBLICATIONS

Samuli Laine and Tero Karras. 2011. High-performance software rasterization on GPUs. In Proceedings of the ACM SIGGRAPH Symposium on High Performance Graphics (HPG '11). Association for Computing Machinery, New York, NY, USA, 79â88. https://doi.org/10.1145/2018323.2018337 (Year: 2011).*

(Continued)

*Primary Examiner* — Said Broome
*Assistant Examiner* — Jordan Wan Yick
(74) *Attorney, Agent, or Firm* — Morgan, Lewis & Bockius LLP

(57) ABSTRACT

A soft rasterizing method includes: obtaining primitive data of a plurality of triangles of a three-dimensional model; performing a first coverage test on the plurality of triangles and a plurality of first blocks of a camera viewport through n thread blocks to obtain first data corresponding to the plurality of first blocks respectively, the first data including primitive data of a first triangle cluster that intersects with the first blocks; performing a second coverage test on a first triangle cluster of a first target block and a plurality of second blocks through n thread blocks based on the first data to obtain second data corresponding to the plurality of (Continued)

second blocks respectively, the second data including primitive data of a second triangle cluster that intersects with the second blocks; and rendering triangles in the second triangle cluster of a second target block to pixels in the second target block.

20 Claims, 12 Drawing Sheets

(58) Field of Classification Search
CPC . G06T 3/40; G06T 7/11; G06T 3/4023; G06T 15/20; G06T 15/205; G06T 2207/20021; G06T 2207/20132; Y02D 10/00
See application file for complete search history.

(56) References Cited

FOREIGN PATENT DOCUMENTS

| | | | |
|---|---|---|---|
| CN | 102736947 | A | 10/2017 |
| CN | 111127299 | A | 5/2020 |

OTHER PUBLICATIONS

Liu, Shichen, et al. "Soft rasterizer: A differentiable renderer for image-based 3d reasoning." ÂProceedings of the IEEE/CVF international conference on computer vision. 2019. (Year: 2019).*
Tencent Technology (Shenzhen) Company Limited, ISR, PCT/CN2022/135590, Feb. 22, 2023, 2 pgs.

* cited by examiner a b a b a b c a b c a b c

SOFT RASTERIZING METHOD AND APPARATUS, DEVICE, MEDIUM, AND PROGRAM PRODUCT

CROSS-REFERENCE TO RELATED APPLICATIONS

This application is a continuation application of PCT Patent Application No. PCT/CN2022/135590, entitled "SOFT RASTERIZING METHOD AND APPARATUS, DEVICE, MEDIUM, AND PROGRAM PRODUCT" filed on Nov. 30, 2022, which claims priority to Chinese Patent Application No. 202210238510.7, entitled "SOFT RASTERIZING METHOD AND APPARATUS, DEVICE, MEDIUM, AND PROGRAM PRODUCT" filed on Mar. 11, 2022, all of which is incorporated by reference in its entirety.

FIELD OF THE TECHNOLOGY

Embodiments of this application relate to the field of computer technologies, and in particular, to a soft rasterizing method and apparatus, a device, a medium, and a program product.

BACKGROUND OF THE DISCLOSURE

Rasterization refers to a process of converting vertex data of a triangle of a three-dimensional model into fragment data of the triangle and generating pixels. The vertex data of the triangle includes parameters such as vertex coordinates, light, and materials.

A soft rasterizer is used in related technologies to directly rasterize a plurality of triangles to a two-dimensional image through a plurality of threads. The soft rasterizer rasterizes a three-dimensional model by using a code creation window without relying on a third-party library as much as possible. The soft rasterizer in the related technologies has low performance for processing a plurality of triangles, and takes a lot of time to directly rasterize a triangle to a two-dimensional image.

How to provide an efficient soft rasterizer is an urgent technical problem to be solved.

SUMMARY

The present application provides a soft rasterizing method and apparatus, a device, a medium, and a program product to improve rasterizing efficiency of a three-dimensional model. Technical solutions are as follows:

According to one aspect of this application, a rasterizing method is performed by a computer device, and the method includes:

- obtaining primitive data of a plurality of triangles of a three-dimensional model in a three-dimensional space;
- performing a first coverage test on the plurality of triangles and a plurality of first blocks of a camera viewport through n thread blocks to obtain first data corresponding to the plurality of first blocks respectively, the first data comprising primitive data of a first triangle cluster that intersects with a respective one of the first blocks, and n being a positive integer;
- performing a second coverage test on a first triangle cluster of a first target block and a plurality of second blocks of the first target block through the n thread blocks based on the first data to obtain second data corresponding to the plurality of second blocks respectively, the second data comprising primitive data of a second triangle cluster that intersects with a respective one of the second blocks, the second triangle cluster being a subset of the first triangle cluster; and
- rendering triangles in the second triangle cluster of a second target block to pixels in the second target block, the second target block being any one of the plurality of second blocks.

According to one aspect of this application, a computer device is provided, the computer device including: a processor and a memory, the memory storing a computer program, and the computer program being loaded and executed by the processor and causing the computer device to implement the foregoing rasterizing method.

According to another aspect, a non-transitory computer-readable storage medium is provided, the computer-readable storage medium storing a computer program, and the computer program being loaded and executed by a processor of a computer device and causing the computer device to implement the foregoing rasterizing method.

The technical solutions provided by the embodiments of this application include at least the following beneficial effects:

This application provides a soft rasterizing method, which provides a hierarchical rasterizing process by performing a first coverage test on a plurality of triangles and a plurality of first blocks through n thread blocks, performing, for a first target block among the plurality of first blocks, a second coverage test on a first triangle cluster that intersects with the first target block and a plurality of second blocks that are obtained by dividing the first blocks, and rendering, for a second target block among the plurality of second blocks, fragment data of a second triangle cluster that intersects with the second target block to the second target block, thereby improving rasterizing efficiency.

DESCRIPTION OF EMBODIMENTS

First, terms involved in the embodiments of this application are introduced.

Differentiable rendering: A rendering process may be regarded as a differentiable function that inputs a three-dimensional model, light, and maps, and outputs a two-dimensional image. Differentiable rendering represents derivation of the differentiable function and use in an artificial intelligence algorithm framework such as gradient descent.

Heterogeneous: A soft rasterizing method provided in the exemplary embodiments of this application may be distributed and run in different hardware such as CPU (Central Processing Unit/Processor) and GPU (Graphics Processing Unit).

Figure 1:
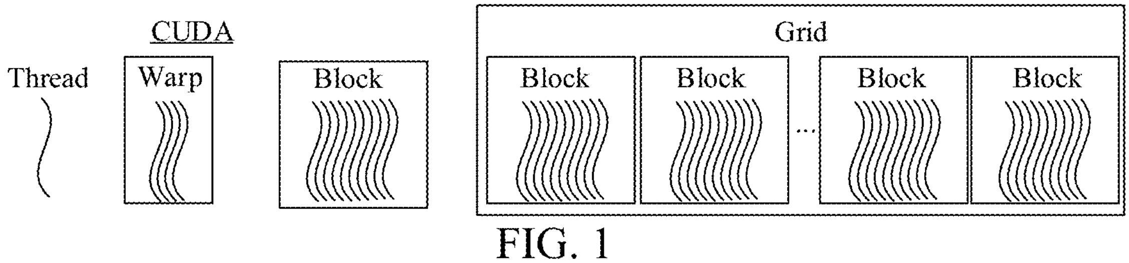
FIG. 1 illustrates a schematic diagram of a CUDA according to an exemplary embodiment.

CUDA (Compute Unified Device Architecture): With reference to FIG. 1, in a CUDA, a grid includes n thread blocks (also known as "thread blocks"), each block includes p warps, and each warp includes q threads. The CUDA is a universal parallel compute architecture used for graphics processing hardware (such as GPU) to solve complex computing problems. In one embodiment of this application, the used CUDA is as follows: A grid includes 16 blocks, each block includes 16 warps, and each warp includes 32 threads. In the CUDA, the blocks are basic units for processing triangles.

Figure 2:
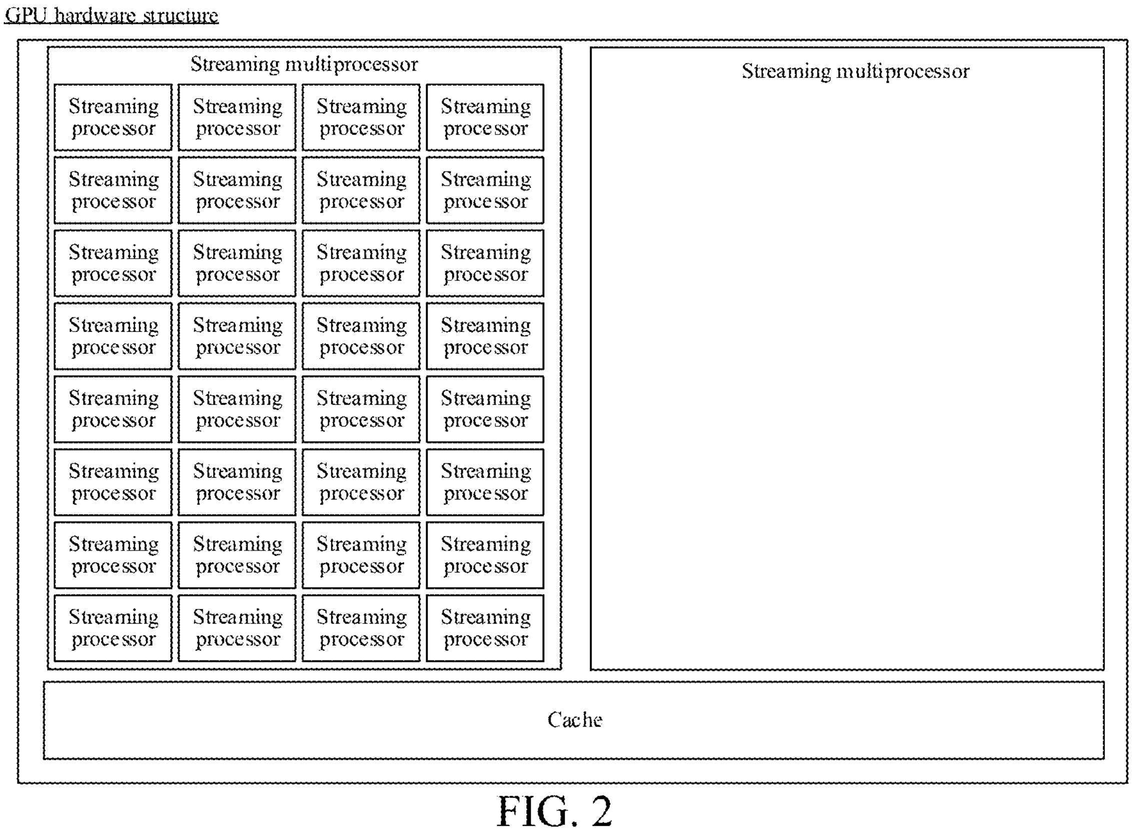
FIG. 2 illustrates a schematic diagram of a GPU hardware structure according to an exemplary embodiment.

GPU hardware structure: With reference to FIG. 2, in a GPU, a streaming multiprocessor (SM) includes a plurality of streaming processors (SPs). SP is also known as a CUDA core. SP corresponds to a thread in CUDA, and SM corresponds to a warp in CUDA.

The following will briefly introduce a process of transforming a three-dimensional model in a three-dimensional space into a two-dimensional image, namely, a rendering process:

(1) Transform a three-dimensional model in a model space coordinate system into a world space coordinate system through a model transformation matrix, the world space coordinate system being used for describing coordinates of all three-dimensional models in a same scenario;

(2) Transform the three-dimensional model in the world space coordinate system into a camera space coordinate system through a view matrix, the camera space coordinate system being used for describing coordinates of the three-dimensional model observed through a camera;

(3) Transform the three-dimensional model in the camera space coordinate system into a clip space coordinate system through a projection matrix. A commonly used perspective projection matrix (a projection matrix) is used for projecting a three-dimensional model into a three-dimensional model that conforms to a human eye observation rule of "small in the distance and big on the contrary".

The model transformation matrix, the view matrix, and the projection matrix are generally referred to as MVP (Model View Projection) matrices.

After the foregoing transformation to a clip space, a rasterizing stage of the three-dimensional model will be performed next. In common cases, the three-dimensional model includes a plurality of triangles. Only rasterization of a triangle is explained below.

Rasterizing Stage:

(4) Perform a clip operation in the clip space to clip triangles intersecting with the clip space according to vertex coordinates of the triangles, and remove triangles outside the clip space.

(5) Transform the triangles in the clip space coordinate system into triangles in a normalized device coordinate system space (ndc space) through perspective division, where the perspective division is used for transforming homogeneous coordinates w of triangle vertices into 1, and a numerical range of the normalized device coordinate system space is [−1, 1].

(6) Remove triangles facing away from the camera in the normalized device coordinate system space.

(7) Transform the triangles in the normalized device coordinate system space into triangles in a screen space through viewport transformation, and preserve original z-axis coordinates. The screen space may be understood as a coordinate system in pixels, such as 2080 px*2080 px.

(8) Perform primitive assembly. In fact, all the triangles mentioned above are vertices of the triangles and do not constitute triangles. In this step, the triangles are assembled to obtain triangle primitives (including not only the vertices of the triangles, but also edges of the triangles).

(9) Interpolate fragment data of the vertices of the triangles to obtain fragment data of the triangle primitives.

(10) Input the fragment data of the triangles into pixels to obtain a two-dimensional image.

On the foregoing basis, there may also be a step of depth testing in rasterization. The depth testing is to determine whether to draw a triangle according to the z-axis coordinates of the triangle. The depth testing may be understood as a model farther away from the camera is occluded by a model closer to the camera (when the models are made of opaque materials).

Figure 3:
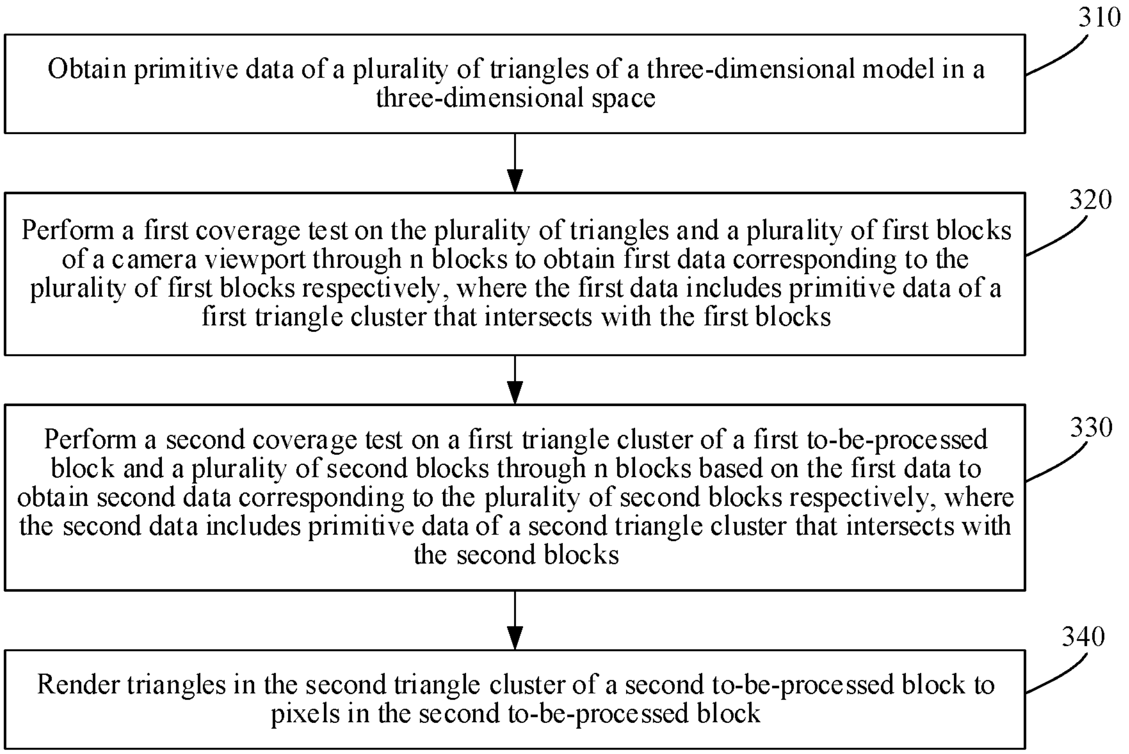
FIG. 3 illustrates a flowchart of a soft rasterizing method according to an exemplary embodiment.

FIG. 3 is an overall flowchart of a soft rasterizing method according to an exemplary embodiment of this application. The method is performed by a computer device, and includes:

Step 310. Obtain primitive data of a plurality of triangles of a three-dimensional model in a three-dimensional space.

Figure 4:
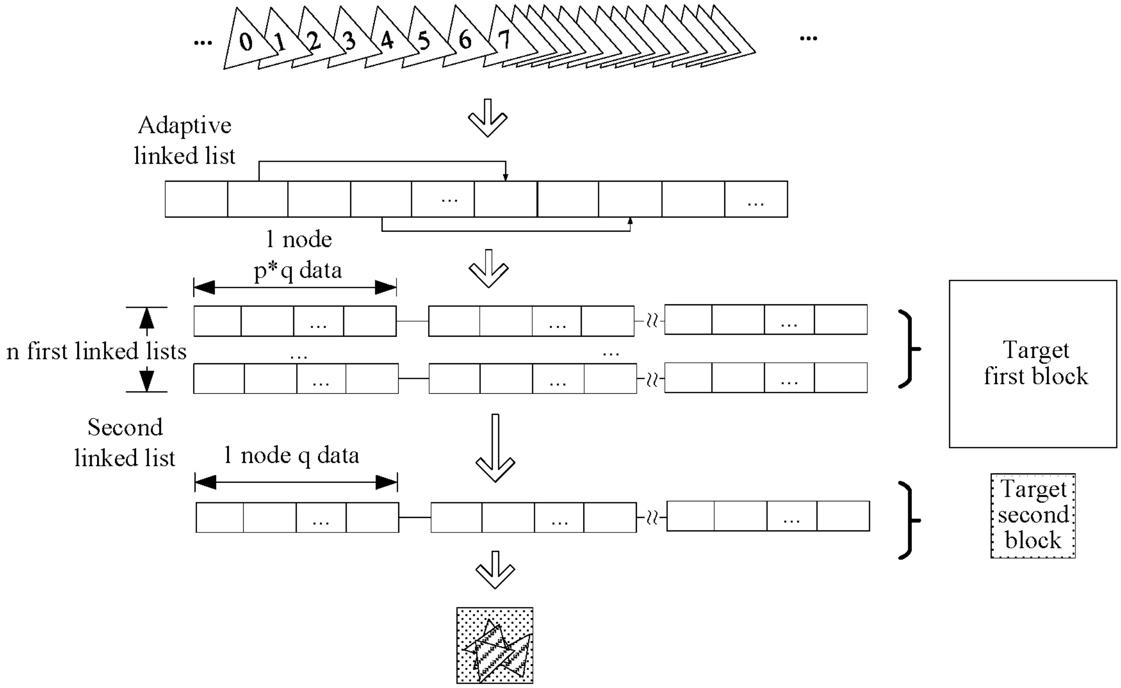
FIG. 4 illustrates a schematic diagram of a soft rasterizing method according to an exemplary embodiment.

In one embodiment, with reference to FIG. 4, the computer device obtains the primitive data of the plurality of triangles and then stores the primitive data of the triangles in an adaptive linked list, where one node of the adaptive linked list corresponds to the primitive data of one triangle. In some embodiments, the primitive data of the triangles includes vertex coordinates of the triangles.

Step 320. Perform a first coverage test on the plurality of triangles and a plurality of first blocks of a camera viewport through n thread blocks to obtain first data corresponding to the plurality of first blocks respectively, where the first data includes primitive data of a first triangle cluster that intersects with the first blocks.

Figure 5:
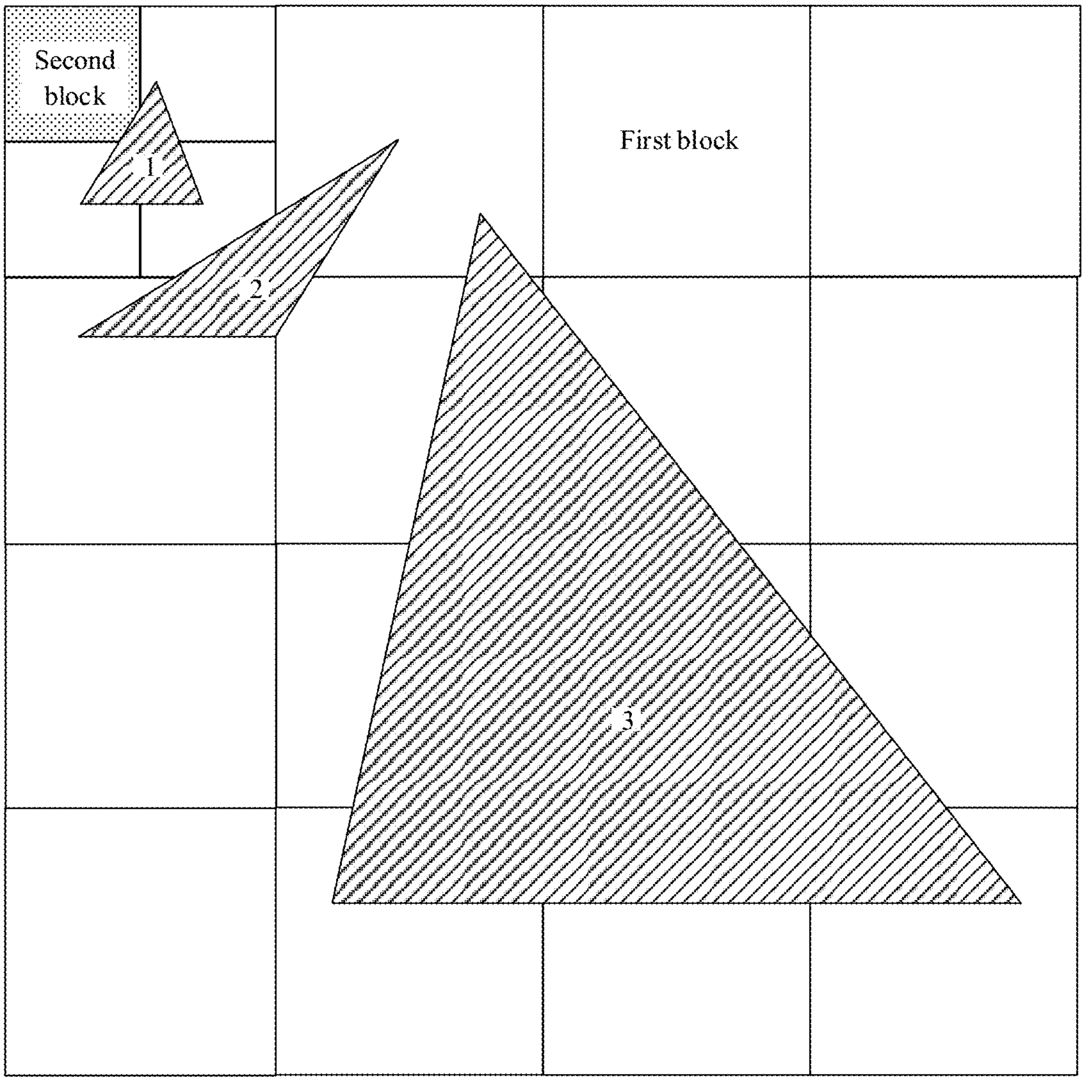
FIG. 5 illustrates a schematic diagram of a soft rasterizing method according to an exemplary embodiment.

The plurality of first blocks are obtained by dividing the camera viewport, and n is a positive integer. Refer to FIG. 5. FIG. 5 briefly illustrates a relationship between the camera viewport and the first blocks. In FIG. 5, the camera viewport may be divided into 16 first blocks, and each first block may be further divided into 4 second blocks.

In some embodiments, the camera viewport (which may be understood as a screen) may be divided into 256 first blocks, each of which may be further divided into 256 second blocks. For a 2048*2048 camera viewport, first blocks have a size of 128*128, and second blocks have a size of 8*8.

With reference to FIG. 5, triangle 1 covers the first block in row 1 and column 1;

Triangle 2 covers the first block in row 1 and column 1, the first block in row 1 and column 2, the first block in row 2 and column 1, and the first block in row 2 and column 2; and Triangle 3 covers the first block in row 1 and column 2, the first block in row 2 and column 2, the first block in row 2 and column 3, the first block in row 3 and column 2, the first block in row 3 and column 3, the first block in row 3 and column 4, the first block in row 4 and column 2, the first block in row 4 and column 3, and the first block in row 4 and column 4.

For example, the coverage between a triangle and a first block is used for indicating that there is an overlap region between the triangle and the first block.

The computer device performs the first coverage test on the plurality of triangles and the plurality of first blocks through the n thread blocks, and the n thread blocks will obtain the first data of each first block. For a first target block among the plurality of first blocks, the n thread blocks obtain the first data of the first target block, and the n thread blocks stores, in n first linked lists, the primitive data of the first triangle cluster that intersects with the first target block.

With reference to FIG. 4, the n first linked lists correspond to the n thread blocks one to one, and the number of triangles stored by one node in the first linked list corresponds to the number of threads in one block. In the CUDA, each block includes p warps, and each warp includes q threads.

Schematically, in the CUDA, a grid includes 16 blocks, each block includes 16 warps, each warp includes 32 threads, and the node in the first linked list stores primitive data of 16*32 triangles. In some embodiments, the node in the first linked list stores the primitive data as indexes of the triangles. The indexes of the triangles indicate data such as vertex coordinates of the triangles.

In some embodiments, the computer device performs the first coverage test on the plurality of triangles and the plurality of first blocks of the camera viewport in parallel through the n thread blocks to determine the primitive data of the first triangle cluster that intersects with the first target block, and stores in parallel, through the n thread blocks, triangles that intersect with the first target block, to obtain n first linked lists corresponding to the first target block.

In a single round of parallel computation, one of the n thread blocks processes p*q triangles among the plurality of triangles, an $i^{th}$ first linked list among the n first linked lists is used for storing first coverage test results of an $i^{th}$ block, the $i^{th}$ first linked list includes at least one node, and the node stores index data of the p*q triangles that intersect with the first target block. The n thread blocks determine, through rounds of computation, the first triangle cluster that intersects with the first target block, where i is a positive integer not greater than n; n, p, and q are positive integers; and p*q represents a product of positive integers p and q.

Step 330. Perform a second coverage test on a first triangle cluster of a first target block and a plurality of second blocks through n thread blocks based on the first data to obtain second data corresponding to the plurality of second blocks respectively, where the second data includes primitive data of a second triangle cluster that intersects with the second blocks.

The plurality of second blocks are obtained by dividing the first target block, and the second triangle cluster is a subset of the first triangle cluster. For the first target block among the plurality of first blocks, step 320 above obtains n first linked lists of the first target block, where the n first linked lists store the primitive data of the first triangle cluster that intersects with the first target block. Afterwards, the computer device performs, based on the primitive data of the first triangle cluster, the second coverage test on the first triangle cluster and the plurality of second blocks through the n thread blocks. For a second target block among the plurality of second blocks, the n thread blocks obtain second data of the second target block. The N blocks use 1 second linked list to store the primitive data (second data) of the second triangle cluster that intersects with the second target block.

With reference to FIG. 4, the n thread blocks obtains 1 second linked list, where the number of triangles stored by one node in the second linked list corresponds to the number of threads in one warp.

Schematically, the warp in the CUDA includes 32 threads, and the node in the second linked list stores the primitive data of 32 triangles. In some embodiments, the node in the second linked list stores the primitive data as indexes of the triangles. The indexes of the triangles indicate data such as vertex coordinates of the triangles.

With reference to FIG. 5, triangle 1 covers the second block in row 1 and column 1, the second block in row 1 and column 2, the second block in row 2 and column 1, and the second block in row 2 and column 2 in the first block where triangle 1 is located.

In some embodiments, the computer device performs the second coverage test on the first triangle cluster and the plurality of second blocks in parallel through the n thread blocks to determine primitive data of the second triangle cluster that intersects with the second target block, and stores in parallel, through the n thread blocks, triangles that intersect with the second target block, to obtain 1 second linked list corresponding to the second target block.

In the single round of parallel computation, one of then thread blocks processes p*q triangles in the first triangle cluster, the second linked list includes at least one node, and the node stores index data of q triangles that intersect with the second target block. The n thread blocks determine, through rounds of computation, the second triangle cluster that intersects with the second target block, where n, p, and q are positive integers.

Step 340. Render triangles in the second triangle cluster of a second target block to pixels in the second target block.

The second target block is any one of the plurality of second blocks. With reference to FIG. 4, for the second target block among the plurality of second blocks, the computer device obtains the second linked list of the second target block, and then the computer device renders fragment data of the second triangle cluster stored in the second linked list to the pixels in the second target block.

To sum up, this application provides a soft rasterizing method, which can overcome a defect that hardware rasterization not supporting open-source operations cannot modify rasterizing parameters according to actual rendering requirements. For example, in a hardware rasterizer, quantities of warps and threads used for rasterizing triangles are fixed. When many triangles are required to be rasterized, use of fewer threads for rasterizing reduces rasterizing efficiency. When a few triangles are required to be rasterized, use of more threads for rasterizing wastes computer resources. However, the soft rasterizer is not limited to inherent hardware and rendering interfaces, and can easily and flexibly complete distribution and deployment of distributed and heterogeneous rendering tasks.

In addition, a hierarchical rasterizing process is provided by performing a first coverage test on a plurality of triangles and a plurality of first blocks through n thread blocks, performing, for a first target block among the plurality of first blocks, a second coverage test on a first triangle cluster that intersects with the first target block and a plurality of second blocks that are obtained by dividing the first blocks, and rendering, for a second target block among the plurality of second blocks, fragment data of a second triangle cluster that intersects with the second target block to the second target block, thereby improving rasterizing efficiency.

Based on the embodiment shown in FIG. 3, a following step is further included before step 320:

Set at least one of a quantity of blocks n, a quantity of warps p included in each block, and a quantity of threads q included in each warp based on a quantity of the plurality of triangles.

In one embodiment, a technician may set specific values of n, p, and q based on the quantity of the plurality of triangles and/or a structure of the computer device running the soft rasterizer. For example, the computer device includes a few computing cores, and at least one of n, p, and q is set to a smaller value; or the computer device includes a lot of computing cores, and at least one of n, p, and q is set to a larger value. For another example, the quantity of the plurality of triangles is small, and at least one of n, p, and q is set to a smaller value; or the quantity of the plurality of triangles is large, and at least one of n, p, and q is set to a larger value.

It may be understood that one difference between the soft rasterizer and the hardware rasterizer is that the parameters inside the software rasterizer can be modified, while rasterization algorithms of the hardware rasterizer are fixed on rendering pipelines and cannot be changed according to specific rasterizing requirements.

Figure 6:
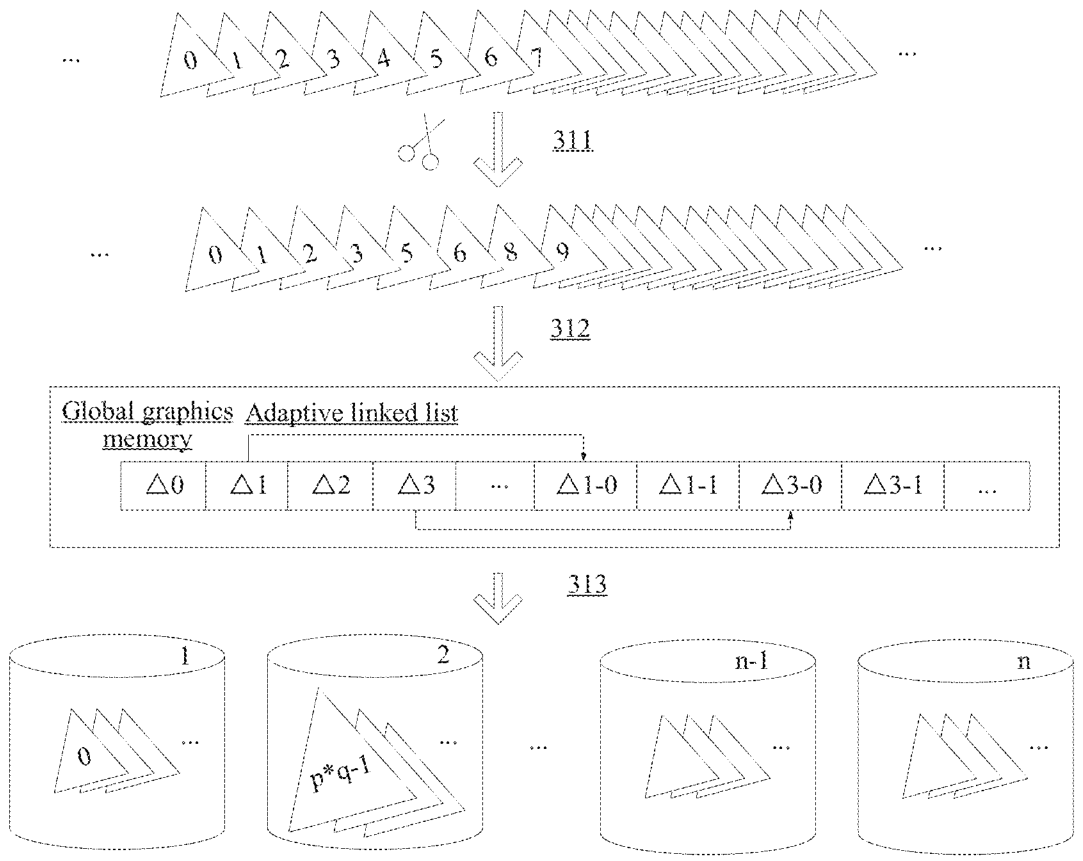
FIG. 6 illustrates a schematic diagram of a soft rasterizing method according to another exemplary embodiment.

Next, sub-steps of step 310 above will be introduced with reference to FIG. 6.

311. Obtain and filter the primitive data of the plurality of triangles of the three-dimensional model in the three-dimensional space.

With reference to FIG. 6, it may be seen that, after obtaining the primitive data of the plurality of triangles, the computer device further filters the plurality of triangles according to the primitive data of the plurality of triangles. The filtering method includes at least one of the following:

Remove triangles outside the camera viewport from the plurality of triangles of the three-dimensional model.

Figure 7:
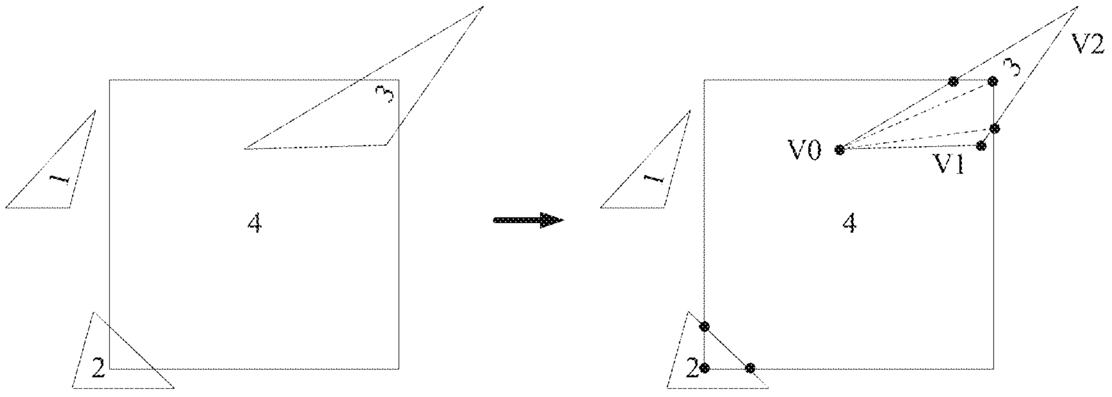
FIG. 7 illustrates a schematic diagram of filtering triangles according to an exemplary embodiment.

With reference to FIG. 7, square 4 represents the camera viewport. Obviously, triangle 1 is located outside the viewport, so triangle 1 is removed.

Clip triangles with sub-regions located within the camera viewport from the plurality of triangles of the three-dimensional model.

With reference to FIG. 7, triangle 2 and triangle 3 obviously have sub-regions located within the camera viewport, so triangle 2 and triangle 3 are clipped. To clip triangle 2 and triangle 3, sub-points are required to be determined in triangle 2 and triangle 3 for constructing sub-triangles. FIG. 7 boldly annotates 3 sub-points to be determined for triangle 2 and 5 sub-points to be determined for triangle 3.

The following will introduce a process of determining the sub-points of triangle 3.

In a method for determining sub-points of a triangle according to an embodiment of this application, the determination of the sub-points of triangle 3 needs to consider XYZ axes separately, and ultimately the sub-points determined through the XYZ axes are connected into at least one sub-triangle. Next, a detailed explanation on how to determine sub-points based on the X-axis is provided.

Figure 8:
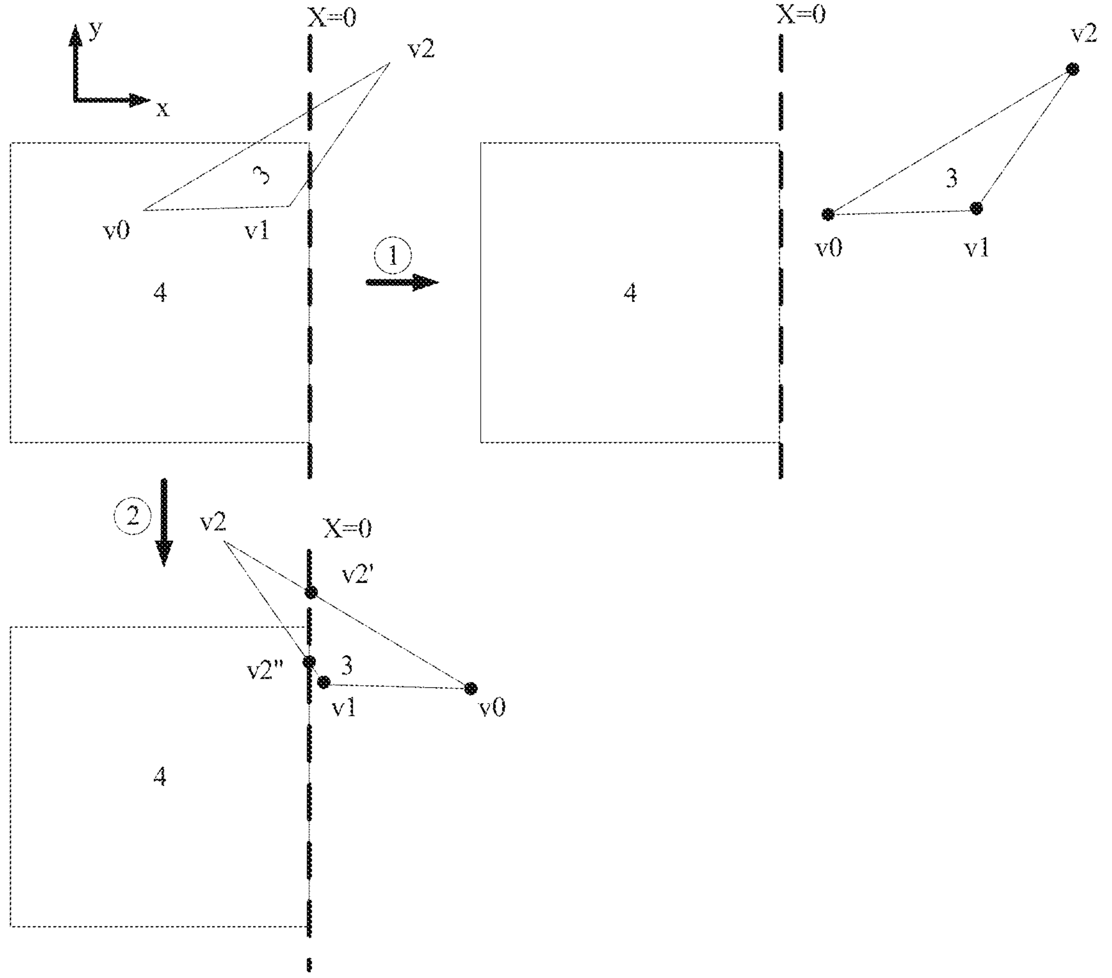
FIG. 8 illustrates a schematic diagram of filtering triangles according to another exemplary embodiment.

With reference to FIG. 8, first, based on an initial position relationship between triangle 3 and camera viewport 4, triangle 3 is moved forward by a distance of W along the X-axis, where a value of W is half of a length of the camera viewport (a w component of a homogeneous coordinate system in the clip space). If an X coordinate symbol of a vertex of triangle 3 is positive after movement, the vertex is retained as a sub-point. From FIG. 8, it can be seen that after (1), X coordinate symbols of three vertices of triangle 3 are all positive, and vertices V0, V1, and V2 are obtained. Then, based on the initial position relationship between triangle 3 and camera viewport 4, triangle 3 is made axisymmetric about the X-axis. If the X coordinate symbol of a vertex among the three vertices obtained from (1) becomes negative, the vertex is removed. As shown in FIG. 8, only two vertices V0 and V1 are retained after (2). In addition, (2) also obtains points VT and VT' that intersect with an edge of the camera viewport with X=0 in triangle 3. It can be seen from FIG. 8 that a total of 4 sub-points are retained after (2). Therefore, 4 sub-points (V0, V1, V2', and V2") of triangle 3 to be clipped can be determined based on the X-axis.

Similarly, a group of sub-points can be obtained on the Y-axis based on the same strategy, and a group of sub-points can be obtained on the Z-axis based on the same strategy. All the sub-points are interpolated based on a barycentric coordinate system to obtain new sub-points, and all the sub-points are connected in order to generate final sub-triangles. As shown in FIG. 7, triangle 3 may be divided into 3 sub-triangles according to dashed lines.

Remove triangles, bounding boxes of which are not greater than a pixel and do not cover diagonal points of the pixel, from the plurality of triangles of the three-dimensional model.

Figure 9:
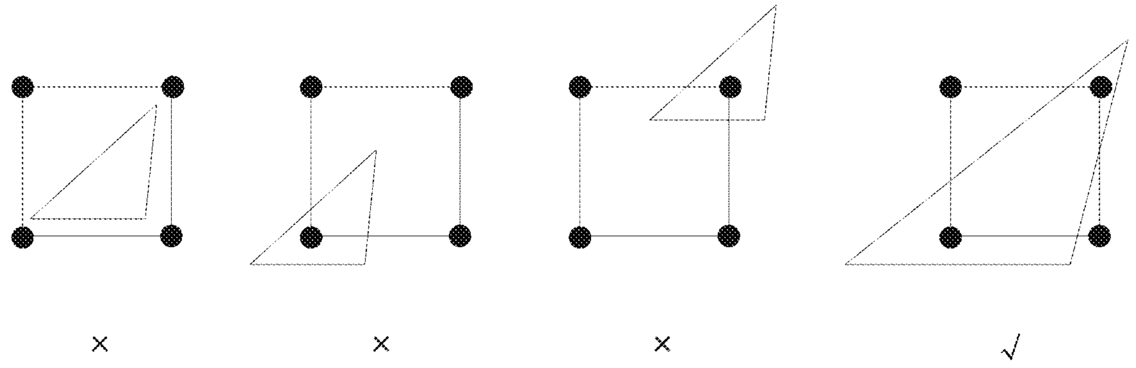
FIG. 9 illustrates a schematic diagram of filtering triangles according to another exemplary embodiment.

With reference to FIG. 9, four cases correspond in order from left to right: "the bounding box of the triangle is less than a pixel", "the triangle does not cover diagonal sub sampling points of a pixel", "the triangle does not cover diagonal sub sampling points of a pixel", and "the triangle satisfy conditions".

FIG. 6 further illustrates that triangles 4 and 7 have been removed. For the convenience of expression, triangles are renumbered 1, 2, 3 . . . in subsequent adaptive linked lists, but the removed triangles are substantially not in the subsequent adaptive linked lists, and the clipped triangles are still retained.

The foregoing step of filtering the plurality of triangles is performed in a normalized device space. As the transformation from the clip space to the normalized device space "flattens" a view cone, XYZ coordinate values of the three-dimensional model in the normalized device space will be within [−1, 1], which is conducive to the foregoing clip and removal operations on triangles.

312. Store the primitive data of the plurality of selected triangles to an adaptive linked list.

After the computer device obtains the filtered primitive data of the plurality of triangles, the computer device further stores the filtered primitive data of the plurality of triangles in the adaptive linked list. When one edge triangle among the plurality of triangles after filtering is clipped to at least one sub-triangle, a rear segment of the adaptive linked list stores at least one node corresponding to the at least one sub-triangle, a front segment of the adaptive linked list stores nodes in one-to-one correspondence to the plurality of triangles before being clipped, nodes of the edge triangle store pointers to the at least one node, the nodes of the adaptive linked list store the primitive data of the triangles, and the primitive data of the triangles include vertex coordinates of the triangles.

With reference to the adaptive linked list shown in FIG. 6, one node corresponds to one triangle, where "Δ0" represents primitive data of triangle 0, "Δ1" represents a pointer to sub-triangle 1-0 of triangle 1, and "Δ1-0" represents primitive data of sub-triangle 1-0. Triangle 1 and triangle 3 shown in FIG. 6 are edge triangles.

Figure 10:
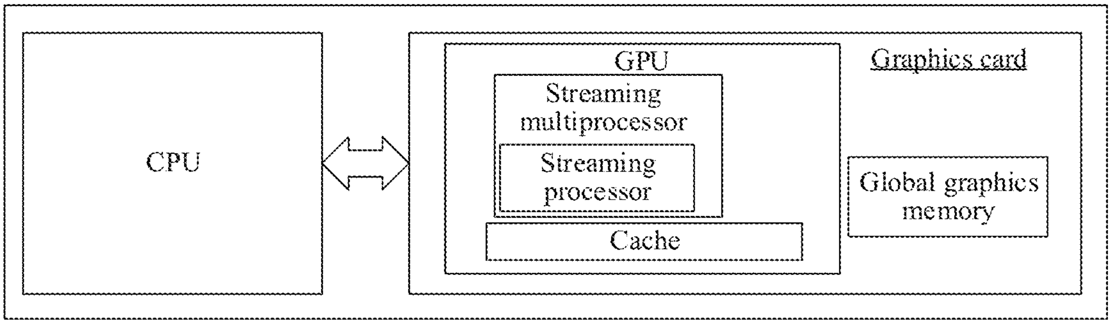
FIG. 10 illustrates a schematic diagram of a computer system according to an exemplary embodiment.

In some embodiments, FIG. 6 further illustrates that the adaptive linked list is stored in a global graphics memory at this time. In all embodiments of this application, the software rasterizing method is mainly implemented by running code, where parallel structures of the CUDA are accelerated by parallel hardware. In some embodiments, the software rasterizing method provided in this application may be implemented by CPU+GPU isomerized hardware, or fully implemented by GPU hardware. When the CUDA is applied to a GPU hardware structure, the adaptive linked list will be stored in a global graphics memory. The hardware structure of CPU+GPU may be simply referred to FIG. 10. A graphics card has the global graphics memory, a GPU computing chip has a cache and at least one streaming multiprocessor (SM), and the streaming multiprocessor has at least one streaming processor (SP). SM corresponds to warps of CUDA, and SP corresponds to threads of CUDA.

313. Obtain n batches of triangles from the adaptive linked list in a single round of computation.

With reference to FIG. 6, the n batches of triangles correspond to the n thread blocks, each batch includes p*q triangles, one block includes p*q threads, and one batch of triangles are used for operations in a subsequent block. Schematically, in the single round of computation, the computer device divides n*p*q triangles in the adaptive linked list into n hash buckets, and the number of each hash bucket is consistent with the number of each batch. All the triangles can be rasterized after rounds of computation.

Schematically, in the single round of computation, 16 blocks obtain a total of 16*512 triangles, 1 block includes 16*32 threads, and each thread corresponds to 1 triangle. The computer device divides the 16*512 triangles into 16 hash buckets, and each hash bucket includes 512 triangles. All triangles can be obtained after rounds of computation.

To sum up, the plurality of triangles are filtered to reduce subsequent rounds of computation. Moreover, some or all of the plurality of triangles are divided into n batches in the single round of computation, and one batch of triangles correspond to one block, that is, n thread blocks are limited to process the n batches of triangles in parallel, thereby ensuring subsequent parallel rasterization on the n batches of triangles; and the parallel rasterization on the n batches of triangles improves the efficiency of rasterization on all the triangles.

In some embodiments, the computer device obtains an interpolation plane equation for the triangles according to a perspective-correct interpolation algorithm, and updates the fragment data of the triangles according to the interpolation plane equation, where the interpolation plane equation is used for correcting errors caused by transforming the plurality of triangles from a clip space to a normalized device coordinate system space.

In some embodiments, based on the embodiment shown in FIG. 3, after step 310, a step of pre-computing an interpolation plane equation for the triangles is further included, where the interpolation plane equation is used for interpolating the fragment data of the triangles before inputting the fragment data to the pixels of the second blocks.

In perspective projection, the triangles are transformed from the clip space to the normalized device coordinate space (ndc space) through perspective division. As the perspective division will cause non-linear transformation of the fragment data of the triangles, the fragment data of the triangles in the ndc space are not real fragment data. The fragment data of the triangles in the ndc space cannot linearly correspond to the fragment data of the triangles in the clip space. Therefore, an embodiment of this application provides an interpolation plane equation, and the interpolation plane equation is used for perspective-correct interpolation on fragment data of triangles in a screen space. In this application, the fragment data includes data such as coordinates of vertices of triangles and light and materials of the triangles.

A computation process for deriving the interpolation plane equation in this application will be attached below.

$$\text{Edge}\ (x, y) = \alpha x + \beta y + \gamma; \qquad \text{(Edge function)}$$

α=P1.y−P0.y; β=P0.x−P1.x; γ=P1.x*P0.y−P1.y*P0. x; and P0 and P1 are two points in the screen space, x and y are coordinate axis values in the screen space, and α, β, and γ are coefficients of an edge function.

Figure 11:
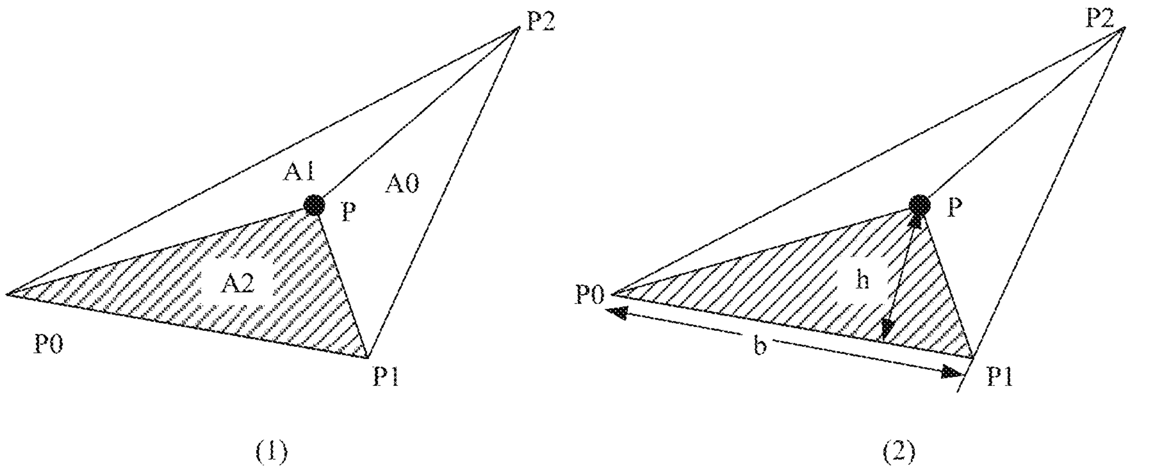
FIG. 11 illustrates a schematic diagram of a triangle of a screen space according to an exemplary embodiment.

With reference to FIG. 11, an area of a shadow in triangle $P_0P_1P$ in FIG. 11 (1) and (2) may be represented by an edge function. If $P_0$ is redirected to an origin, γ will be canceled to obtain:

$$e(x, y) = |b||PP_0|\sin a = 2^{*}\text{area}\ (P_0PP_1);$$

$$u = \frac{e1(x, y)}{2*\text{area}};\ v = \frac{e2(x, y)}{2*\text{area}}.$$

Where e1 (x, y) is an edge function of P0P2, e2(x, y) is an edge function of P1P0, area is A, A is the area of the triangle in the screen space, u and v constitute a barycentric coordinate system in the screen space, a is an angle between two edges $P_0P$ and $P_0P_1$, and b is a length of $P_0P_1$. The above defines the edge function, which can be used for interpolating the barycentric coordinate system of the clip space.

$$\text{Assume}: u_{0c} = \frac{u_{0s}}{w0}, u_{1c} = \frac{u_{1s}}{w1}, u_{2c} = \frac{u_{2s}}{w2};$$

$$uc = (1 - us - vs)^* u0c + u1c^* us + u2c^* \text{vs};$$

$$uc = u0c + (u1c - u0c)^* us + (u2c - u0c)^* \text{vs};$$

$$\text{Assume}: t0 = u0c, t1 = u1c - u0c, t2 = u2c - u0c;$$

$$us = e1\ (x, y)/A, \text{vs} = e2(x, y)/A;$$

$$(x, y) = d2.y^* x - d2.x^* y + c1;$$

$$(x, y) = \text{-}d1.y^* x + d1.x^* y + c2;$$

Where w is a w component of the homogeneous coordinate system, $u_c$ is a u parameter of the barycentric coordinate system in the clip space, $u_s$ is a u parameter of the barycentric coordinate system in the screen space, $u_{0c}$, $u_{1c}$, and $u_{2c}$, are u parameters of points P0, P1 and P2 in the clip space respectively, $v_c$ is a v parameter of the barycentric coordinate system in the clip space, vs is a v parameter of the barycentric coordinate system in the screen space, d1.x is $(P_1-P_0)$.x (known quantity) in the screen space, d1.y is $(P_1-P_0)$.y (known quantity) in the screen space, d2.x is $(P_0-P_2)$.x (known quantity) in the screen space, and d2.y is $(P_0-P_2)$.y (known quantity) in the screen space.

Derivation of $u_c$ can obtain another equation form, such as ax+by +c, which is the origin of the definition of the interpolation plane equation. The following can be solved:

$$a = \frac{t_1 * d2.y - t_2 * d1.y}{A};$$

$$b = \frac{t_2 * d1.x - t_1 * d2.x}{A};$$

$$c = u_{0c} + \frac{t_1 * c_1 + t_2 * c_2}{A}.$$

After the origin of the triangle is repositioned with $v_0$, term c can be simplified to form a basic plane equation (namely, the interpolation plane equation):

$$u_c = \alpha * x' + \beta * y' + u_{0c};$$

$$x' = x - v_0 \cdot x;$$

$$y' = y - v_0 \cdot y.$$

To sum up, the interpolation plane equation provides a method for correcting errors caused by transforming the plurality of triangles from the clip space to the normalized device coordinate system space, thereby ensuring authenticity of the final rendered two-dimensional image.

Figure 12:
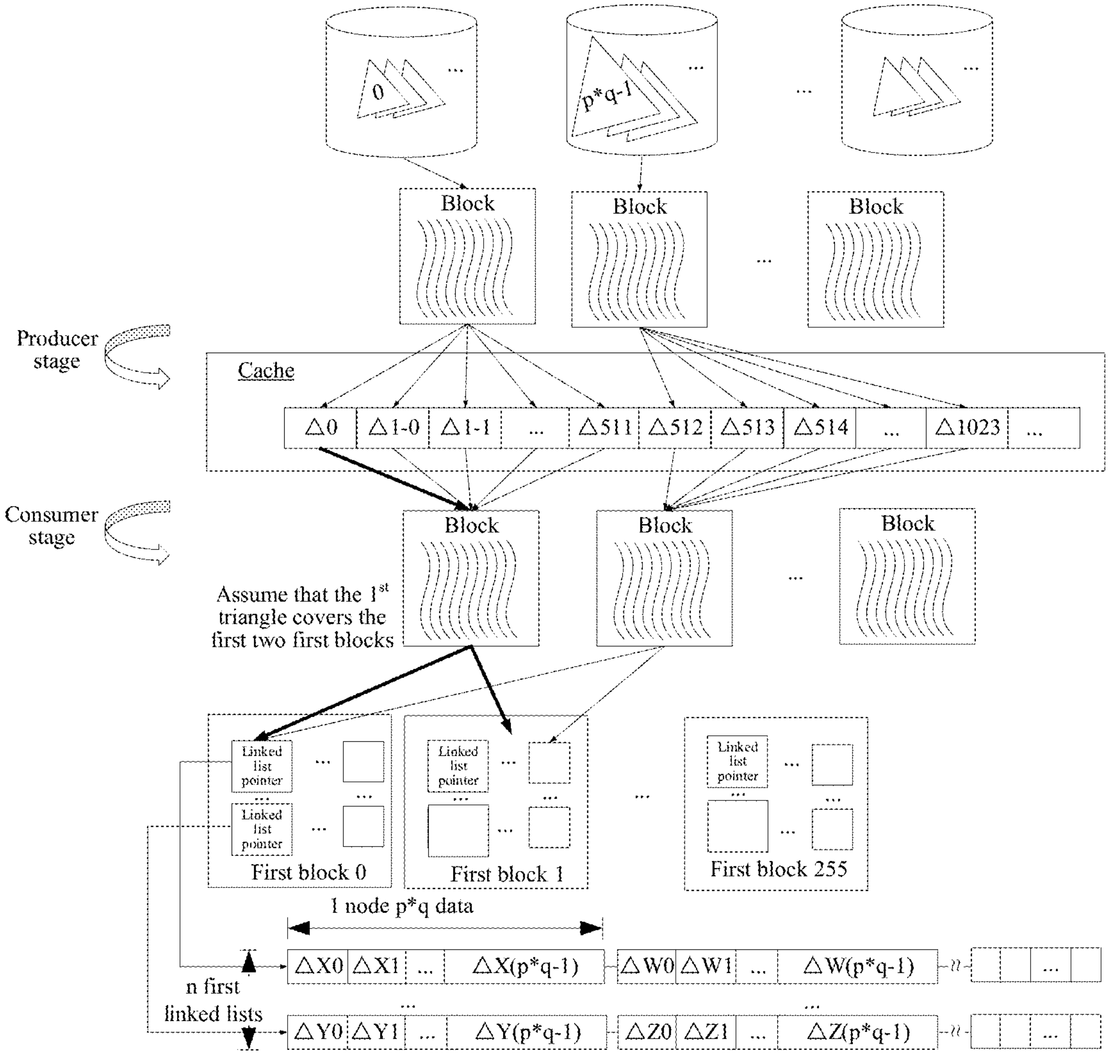
FIG. 12 illustrates a schematic diagram of a soft rasterizing method according to another exemplary embodiment.

Next, sub-steps of step 320 above will be introduced with reference to FIG. 12.

Producer stage: With reference to FIG. 12, in a single round of computation, for one of then thread blocks, the block uploads triangles of one of n batches to the cache. One batch of triangles includes p*q triangles, and p*q threads of the block correspond to the p*q triangles one to one. If a triangle corresponding to a thread has at least one clipped sub-triangle, the thread will upload all sub-triangles.

Schematically, in the single round of computation, each block includes 16 warps, each warp includes 32 threads, and each block is responsible for uploading 512 triangles to the cache. When the CUDA is applied to the GPU hardware structure, the n batches of triangles will be uploaded to the cache. Specifically, when the number of triangles in the last round is less than 512, the block that first completes processing of the previous round of triangles preferentially obtains the triangles.

In the current embodiment, a round of computation refers to a process from n thread blocks obtaining n batches of triangles to the n thread blocks constructing first linked lists of a plurality of first blocks for the n batches of triangles.

For one of the n thread blocks, before the block uploads triangles of one of the n batches to the cache, each thread needs to know a storage location of a triangle to be uploaded by the thread in the cache and reflect on an index of the triangle to be uploaded.

In one embodiment, in the producer stage, for the $i^{th}$ block among the n thread blocks, the computer device determines a storage location of a triangle to be processed by each thread in the $i^{th}$ block in the cache through a synchronous voting mechanism for warps and inclusive scanning of the $i^{th}$ block in the single round of parallel computation; and the computer device uploads the $i^{th}$ batch of triangles from the global graphics memory to the cache through the threads in the $i^{th}$ block, the $i^{th}$ batch of triangles including p*q triangles among the plurality of triangles.

1 triangle corresponds to 1 storage location in the cache. When a thread simultaneously processes a plurality of sub-triangles obtained by clipping, 1 sub-triangle corresponds to 1 storage location.

When the soft rasterizer provided in this application is applied to GPU hardware, the cache exists on a GPU computing chip. In each round of computation, uploading triangles to the cache requires the synchronous voting mechanism for warps and inclusive scanning for blocks, which aim to ensure that a thread always reflects on the index and storage location of the triangle processed by the thread in each round of computation, so that the whole process is strict and orderly.

In the above, when the triangles are clipped into sub-triangles, each triangle is clipped to 6 sub-triangles at most. Each thread knows the number of sub-triangles uploaded by the thread, and each thread can determine storage locations within a thread level. Therefore, each thread only needs to know a starting storage location of the triangle uploaded by the thread. The synchronous voting mechanism for warps is used for computing the starting storage location corresponding to each thread, namely, computing a storage location of each thread at a warp level. Similarly, when each thread can determine the storage location within the warp level, the inclusive scanning for blocks is used for computing a starting storage location corresponding to each warp, namely, computing a storage location of each warp at a block level.

For example, code used for implementing the synchronous voting mechanism at the warp level is as follows:

```
uint32_t
myIdx=_popc(_ballot_sync(FW_U32_MAX,num&1)&get_lane_mask_lt( ));
if(_any_sync(FW_U32_MAX,num>1)){
```

-continued

```
//1 count + 2/3 count*2
myIdx
+=_popc(_ballot_sync(FW_U32_MAX,num&2)&get_lane_mask_lt( ))*2;
//1 count + 2/3 count*2+4/5/6 count*4
myIdx
+=_popc(_ballot_sync(FW_U32_MAX,num&4)&get_lane_mask_lt( ))*4;}
```

For example, code used for implementing the inclusive scanning at the block level is as follows:

```
// broad cast this warp's max index
if (get_lane_ mask_ 1e( ) == FW _U32_ MAX) {
   s_broadcast[threadIdx.y + 16] = myIdx + num;
}
_syncthreads( );
if (thrInB1ock < CR_BIN_WARPS)
{
   volatile uint32_ t* ptr = &s_broadcast[thrInB1ock + 16];
   uint32_t val = * ptr;
#if (BIN_WARPS > 1)
   va1 += ptr[-1]; *ptr = val;
#endif
#if (BIN_ WARPS > 2)
   va1 += ptr[-2]; *ptr = val;
#endif
#if (BIN_ _WARPS > 4)
   va1 += ptr[-4]; *ptr = va1;
#endif
#if (BIN_ _WARPS > 8)
   va1 += ptr[-8]; *ptr = va1;
#endif
#if (BIN_ WARPS > 16)
   va1 += ptr[-16]; *ptr = va1;
#endif
}
```

Consumer stage: The first coverage test is performed on the n batches of triangles and the plurality of first blocks through the n thread blocks in the single round of parallel computation; indexes of the plurality of triangles that intersect with the first target block are stored to the n first linked lists of the first target block in parallel through the n thread blocks, where there is a one-to-one corresponding relationship between the n thread blocks and the n first linked lists; and after rounds of computation, the first triangle cluster that intersects with the first target block among all the triangles will be determined.

With reference to FIG. 12, in the single round of computation, assuming that the first triangle (Δ 0) intersects with the first block 0 and the first block 1, the thread for processing Δ 0 stores an index of Δ 0 to a data space within a node of a first linked list among the n first linked lists of the first block 0, and the index of Δ 0 to a data space within a node of a first linked list among the n first linked lists of the first block 1, where a node of a first linked list includes p*q data spaces, and a first linked list includes a plurality of nodes. Each first block corresponds to n first linked lists, and the n first linked lists correspond to n thread blocks one to one. This process is extended as follows:

First, in the consumer stage, for the $i^{th}$ block among the n thread blocks, the first coverage test is performed on an $i^{th}$ batch of triangles among the n batches and the plurality of first blocks through p*q threads in the $i^{th}$ block in the single round of parallel computation to obtain a first coverage template, where the first coverage template stores the number and indexes of triangles that intersect with each first block.

Figure 13:
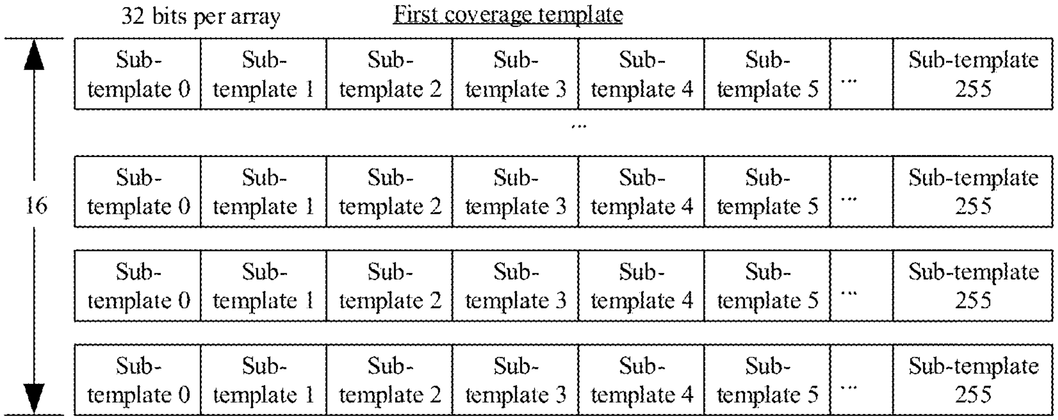
FIG. 13 illustrates a schematic diagram of a first coverage template according to an exemplary embodiment.

With reference to FIG. 13, 256 first blocks are assumed. FIG. 13 shows that the first coverage template of the $i^{th}$ block includes 256 sub-templates, and one sub-template corresponds to one first block. Because each array may accommodate 32 bits of data (corresponding to 32 threads of a warp), there are a total of 16 arrays (corresponding to 16 warps) used for marking a first block. Each sub-template may store 512 ($i^{th}$ batch) triangles and coverage test results of the first block. For a triangle, if the triangle covers a first block, an index of the triangle may be obtained from a sub-template of the first block. The number of triangles within a batch covering the first block may also be obtained from the sub-template of the first block.

In practice, it is common that one triangle covers only one first block. In this application, a special fast optimization is further designed to accelerate the creation of the first coverage template.

For example, code used for implementing the fast optimization is as follows:

```
do {
   // Competitive writing rights
   s_broadcast[threadIdx.y +16] = binIdx;
   int32_t winner          = s_ broadcast[ threadIdx.y + 16];
   won                     = (binIdx = winner);
   uint32_t mask             =ballot_sync(_ activemask( ), won);
// mark who won the id
s_ outMask[threadIdx.y][winner] = mask;
} while ( !won).
```

It may be understood that all threads in a warp write an id of a covered first block to a same address, then read from the address to determine the same id of the first block or not (threads in a warp that write the same id of the first block are called "teammates"), know a quantity of teammates through voting, and obtain a coverage template. If the threads win, the threads exit the competition, or else the threads continue the competition until victory.

Then, the computer device allocates a second linked list space to the first target block through processing threads in the $i^{th}$ block when a remaining capacity of an allocated first linked list space fails to accommodate the indexes of the plurality of triangles determined by the $i^{th}$ block that intersect with the first target block, and determines that the second linked list space is the first to-be-processed linked list space, where the plurality of threads in the $i^{th}$ block correspond to the plurality of first blocks one to one, and the first to-be-processed linked list space is a storage space used for storing one node of the $i^{th}$ first linked list in the global graphics memory.

The computer device determines through processing threads in the $i^{th}$ block that the first linked list space is the first to-be-processed linked list space when a remaining capacity of an allocated first linked list space is enough to accommodate the indexes of the plurality of triangles determined by the $i^{th}$ block that intersect with the first target block, where the plurality of threads in the $i^{th}$ block correspond to the plurality of first blocks one to one.

It is to be understood that, after a first linked list space allocated for a first block is used up, the computer device will reallocate 512 data spaces (512 data spaces are second linked list spaces) to the first block, where one data space corresponds to one triangle. In a single round of computation, for a thread, the thread will compute the number of triangles that intersect with the first block processed by the thread and determine subspaces corresponding to the number. For example, in the single round of computation, the thread computes to obtain 3 triangles that intersect with the first target block, and the thread determines 3 data spaces to store indexes of the 3 triangles. In the next round of computation, the thread computes to obtain 4 triangles that intersect with the first target block, and the thread will determine 4 data spaces to store indexes of the 4 triangles from 509 data spaces that have not been used among 512 pre-allocated data spaces.

Figure 14:
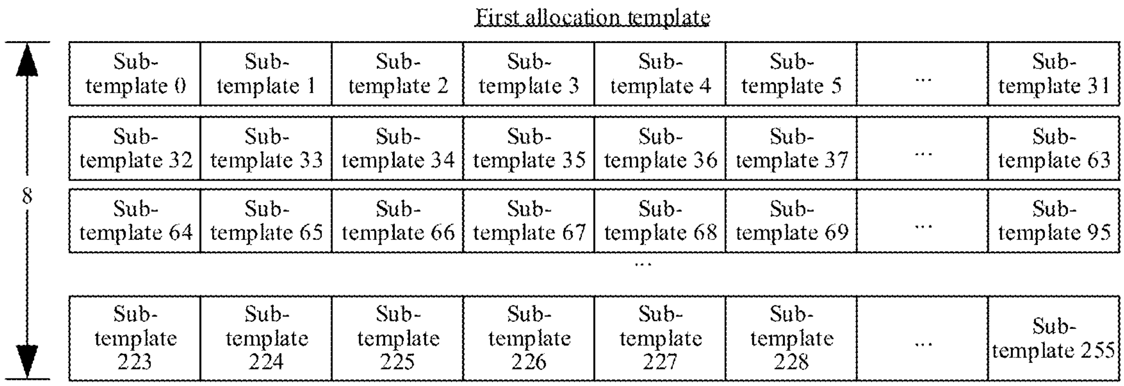
FIG. 14 illustrates a schematic diagram of a first allocation template according to an exemplary embodiment.

In the single round of computation, the $i^{th}$ block will construct the $i^{th}$ first allocation template to determine whether the computer device still needs to reallocate linked list spaces for 256 first blocks. With reference to FIG. 14, one sub-template corresponds to one first block in FIG. 14. Each sub-template is marked with 1 bit of data to indicate whether a linked list space is required to be reallocated. Under each sub-template, "0" indicates that a linked list space is required to be reallocated, and "1" indicates that a linked list space is not required to be reallocated.

Finally, in the single round of parallel computation, the indexes of the plurality of triangles that intersect with the first target block are stored to one node of the $i^{th}$ first linked list through the $i^{th}$ block in a first to-be-processed linked list space, where the $i^{th}$ block corresponds to the $i^{th}$ batch of triangles, and the first to-be-processed linked list space is a storage space used for storing one node of the $i^{th}$ first linked list in the global graphics memory.

That is, for the first target block, the n thread blocks will store the indexes of the triangles that intersect with the first target block to n first linked lists, where 1 block corresponds to 1 first linked list, and the first target block corresponds to the n first linked lists.

Schematically, 1 block includes 16 warps, and 1 warp includes 32 threads. For 1 first block, 16 blocks will construct 16 first linked lists.

After rounds of computation, the n thread blocks complete the coverage test on all the triangles and the plurality of first blocks, and for each first block, the n thread blocks construct n first linked lists.

Schematically, with reference to FIG. 12, the first block has n first linked lists, and one node of the first linked list includes indexes of p*q triangles. In order to ensure that an order of obtaining triangles in subsequent second coverage test is not disrupted, the n first linked lists is kept loose and orderly. The loose and orderly characteristics include: indexes of triangles are stored within a node in descending order of their index values; and within the same first linked list, the index values of the triangles in the preceding node are smaller than those of the triangles in the following node.

With reference to FIG. 12, $\Delta X0<\Delta X1<\Delta X2<<\Delta X(p*q-1)$; $\Delta X(p*q-1)<\Delta W0$, $\Delta Y(p*q-1)<\Delta Z0$; if $\Delta W0<\Delta Z0$, $\Delta W(p*q-1)<\Delta Z0$; and if $\Delta W0>\Delta Z0$, $\Delta W0>\Delta Z(p*q-1)$.

To sum up, the above fully explains a process of performing, by n thread blocks, a first coverage test on a plurality of triangles and a plurality of first blocks, and constructing n first linked lists for one of the plurality of first blocks.

The first coverage test is performed on n batches of triangles and the plurality of first blocks in parallel through the n thread blocks, thereby improving the efficiency of rasterizing all the triangles. Moreover, each first block stores, through n first linked lists, a first triangle cluster that intersects with the first block, and the n first linked lists are kept loose and orderly, so that triangles can still be obtained orderly during subsequent second coverage test. Furthermore, the quantity of triangles stored in one node of the first linked list corresponds to the quantity of threads included in one block, which satisfies that one block still corresponds to triangles of one node during the subsequent second coverage test, thereby ensuring orderly rasterization.

Next, sub-steps of step 330 above will be introduced with reference to FIG.

Producer stage: In a single round of computation, for one of the n thread blocks, the block uploads triangles of one of n batches to the cache. One batch of triangles includes p*q triangles in the first triangle cluster, and p*q threads of the block correspond to the p*q triangles. If a triangle corresponding to a thread has at least one clipped sub-triangle, the thread will upload all sub-triangles.

Schematically, each block includes 16 warps, each warp includes 32 threads, and each block is responsible for uploading 512 triangles to the cache. When the CUDA is applied to the GPU hardware structure, the n batches of triangles will be uploaded to the cache. Specifically, when the number of triangles in the last round is less than 512, the block that first completes processing of the previous round of triangles preferentially obtains the triangles.

In the current embodiment, a round of computation refers to a process from n thread blocks obtaining n batches of triangles to the n thread blocks constructing first linked lists of a plurality of second blocks for the n batches of triangles.

For one of the n thread blocks, before the block uploads triangles of one of the n batches to the cache, each thread needs to know a storage location of a triangle to be uploaded by the thread in the cache and reflect on an index of the triangle to be uploaded.

In one embodiment, the computer device determines a storage location of a triangle processed by each thread in the block in the cache through the synchronous voting mechanism for warps and inclusive scanning for blocks, and then uploads the same batch of triangles from the global graphics memory to the cache through each thread in the block.

1 triangle corresponds to 1 storage location in the cache. When a thread simultaneously processes a plurality of sub-triangles obtained by clipping, 1 sub-triangle corresponds to 1 storage location.

When the soft rasterizer provided in this application is applied to GPU hardware, the cache exists on a GPU computing chip. In each round of computation, uploading triangles to the cache requires the synchronous voting mechanism for warps and inclusive scanning for blocks, which aim to ensure that a thread always reflects on the index and storage location of the triangle processed by the thread in each round of computation, so that the whole process is strict and orderly.

In the above, when the triangles are clipped into sub-triangles, each triangle is clipped to 6 sub-triangles at most. Each thread knows the number of sub-triangles uploaded by the thread, and each thread can determine storage locations within a thread level. Therefore, each thread only needs to know a starting storage location of the triangle uploaded by the thread. The synchronous voting mechanism for warps is used for computing the starting storage location corresponding to each thread, namely, computing a storage location of each thread at a warp level. Similarly, when each thread can determine the storage location within the warp level, the inclusive scanning for blocks is used for computing a starting storage location corresponding to each warp, namely, computing a storage location of each warp at a block level.

Specific code is exhibited in detail above. Refer to the embodiment shown in FIG. 12 for details.

In step 330, a thread in the n thread blocks needs to know which second block among the plurality of second blocks and which triangle the thread will process. Therefore, an embodiment of this application provides a quasi-parallel binary search method.

For example, code used for implementing the quasi parallel binary search method is as follows:

```
ptr = tilePtr + 0x80 * 4;
if (thread >= *(uint32_ _t* )ptr)
  tilePtr = ptr;
ptr = tilePtr + 0x40 *4;
if (thread >= *(uint32 _ _t*)ptr)
  tilePtr = ptr;
ptr = tilePtr + 0x20 * 4;
if (thread >= *(uint32_ _t* )ptr)
  tilePtr = ptr;
ptr = tilePtr + 0x10 * 4;
if (thread >= *(uint32_ _t*)ptr)
  tilePtr = ptr;
ptr = tileptr + 0x08 * 4;
if (thread >= *(uint32_ _t* )ptr)
  tilePtr = ptr;
ptr = tileptr + 0x04 * 4;
if (thread >= *(uint32_ _t* )ptr)
  tilePtr = ptr;
ptr = tileptr + 0x02 * 4;
if (thread >= *(uint32_ _t*)ptr)
  tilePtr = ptr;
ptr = tileptr + 0x01 * 4;
if (thread >= *(uint32_ t* )ptr)
  tilePtr = ptr;
```

Consumer stage: In the consumer stage, the second coverage test is performed on the n batches of triangles and the plurality of second blocks through the n thread blocks in the single round of parallel computation; indexes of the plurality of triangles that intersect with the second target block are stored to the 1 second linked list of the second target block in parallel through the n thread blocks; and after rounds of computation, the second triangle cluster that intersects with the second blocks in the first the triangle cluster will be determined.

Figure 15:
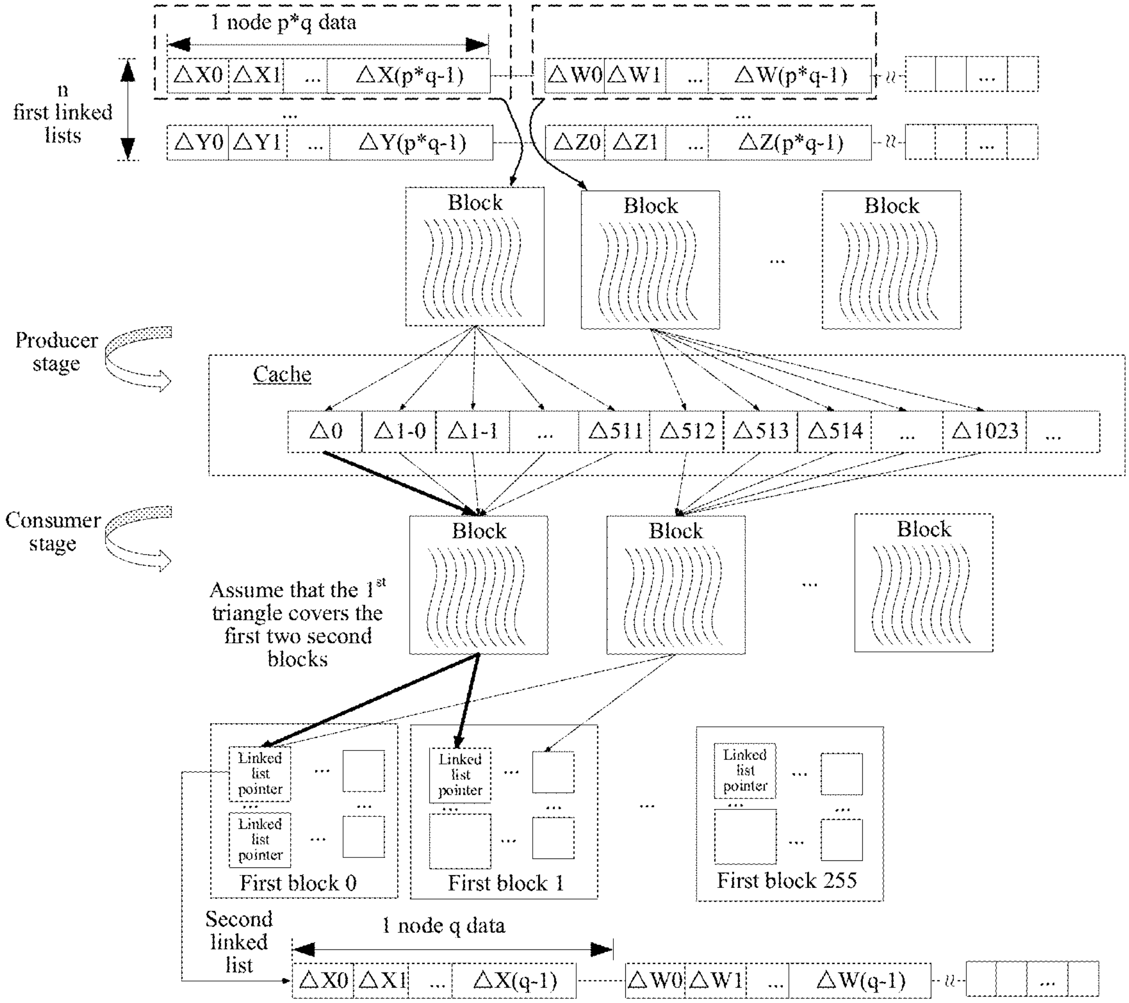
FIG. 15 illustrates a schematic diagram of a soft rasterizing method according to another exemplary embodiment.

With reference to FIG. 15, in the single round of computation, assuming that the first triangle (Δ 0) intersects with the $1^{st}$ second block and the $2^{nd}$ second block, the thread for processing Δ 0 stores an index of Δ 0 to a data space within a node of a second linked list of the $1^{st}$ second block, and stores the index of Δ 0 to a data space within a node of a second linked list of the $2^{nd}$ second block, where a node of a second linked list includes q data spaces, and a second linked list includes a plurality of nodes. Each second block corresponds to a second linked list. The process is extended as follows:

First, in the consumer stage, for the $i^{th}$ block among the n thread blocks, the second coverage test is performed on the $i^{th}$ batch of triangles among the n batches and the plurality of second blocks through p*q threads in the $i^{th}$ block in the single round of parallel computation to obtain a second coverage template, where the second coverage template stores the number and indexes of triangles that intersect with each second block.

Figure 16:
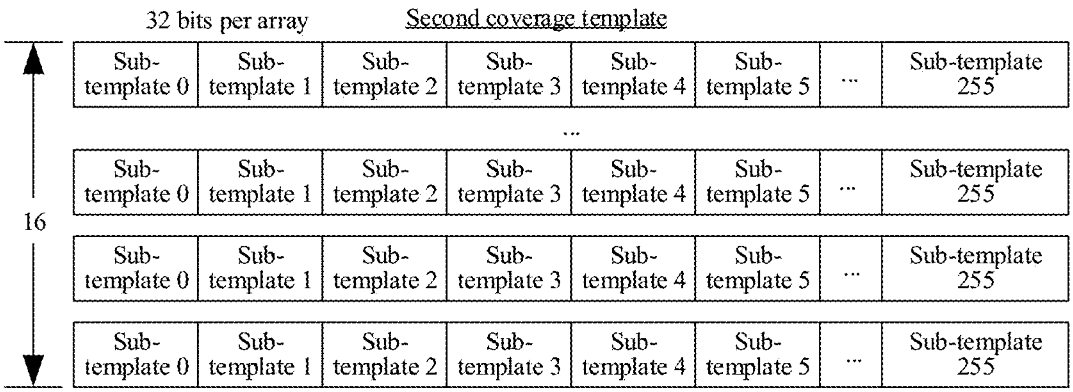
FIG. 16 illustrates a schematic diagram of a second coverage template according to an exemplary embodiment.

Refer to 16. FIG. 16 shows that the second coverage template includes 255 sub-templates, and one sub-template corresponds to one second block. Because each array may accommodate 32 bits of data (corresponding to 32 threads of a warp), there are a total of 16 arrays (corresponding to 16 warps) used for marking a second block. Each sub-template may store 512 triangles and coverage test results of the second block. For a triangle, if the triangle covers a second block, an index of the triangle may be obtained from a second-template of the second block. The number of triangles within a batch covering the second block may also be obtained from the sub-template of the second block.

Then, the computer device allocates a fourth linked list space to the second target block through processing threads in the $i^{th}$ block when a remaining capacity of an allocated third linked list space fails to accommodate the indexes of the plurality of triangles determined by the $i^{th}$ block that intersect with the second target block, and determines that the fourth linked list space is the second to-be-processed linked list space, where the plurality of threads in the $i^{th}$ block correspond to the plurality of second blocks one to one.

The computer device determines through processing threads in the $i^{th}$ block that the first linked list space is the second to-be-processed linked list space when a remaining capacity of an allocated third linked list space is enough to accommodate the indexes of the plurality of triangles determined by the $i^{th}$ block that intersect with the second target block, where the plurality of threads in the $i^{th}$ block correspond to the plurality of second blocks one to one.

Schematically, each block includes 16 warps, each warp includes 32 threads, one thread in the first 8 warps corresponds to one second block, and there are a total of 256 second blocks. For processing threads, subspaces will be determined for the triangles covering the second target block in the second to-be-processed linked list space.

It is to be understood that, after a third list space allocated for a second block is used up, the computer device will reallocate 32 data spaces (32 data spaces are fourth linked list spaces) to the second block, where one data space corresponds to one triangle. In the single round of computation, the thread computes to obtain the number of triangles that intersect with the second block and determines subspaces corresponding to the number. For example, in the single round of computation, the thread computes to obtain 3 triangles that intersect with the second block, and the thread determines 3 data spaces to store indexes of the 3 triangles. In the next round of computation, the thread computes to obtain 4 triangles that intersect with the second block, and the thread will determine 4 data spaces to store indexes of the 4 triangles from 29 data spaces that have not been used among 32 pre-allocated data spaces.

Figure 17:
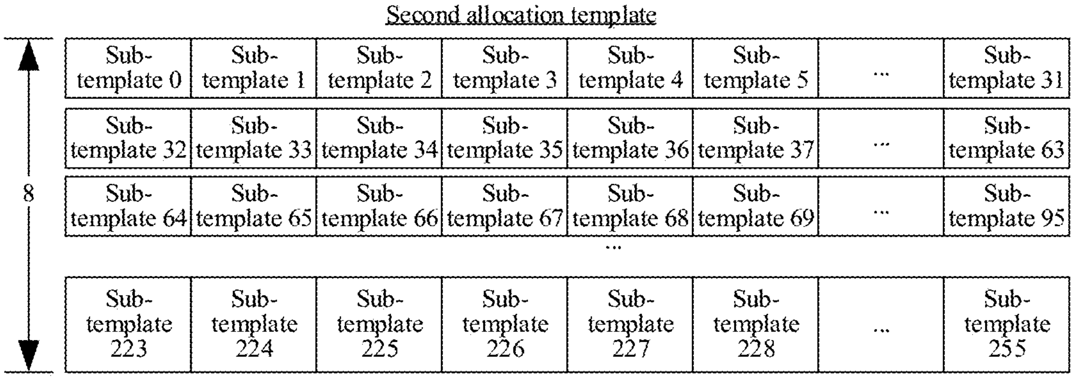
FIG. 17 illustrates a schematic diagram of a second allocation template according to an exemplary embodiment.

In the single round of computation, a block will construct a second allocation template to determine whether the computer device still needs to reallocate linked list spaces for 256 second blocks. With reference to FIG. 17, one sub-template corresponds to one second block in FIG. 17. Each sub-template is marked with 1 bit of data to indicate whether a linked list space is required to be reallocated. Under each sub-template, “0” indicates that a linked list space is required to be reallocated, and “1” indicates that a linked list space is not required to be reallocated.

Finally, in the single round of parallel computation, the indexes of the plurality of triangles that intersect with the second target block are stored to one node of the 1 second linked list through the it h block in a second to-be-processed linked list space, where the it h block corresponds to the it h batch of triangles, and the second to-be-processed linked list space is a storage space used for storing one node of the 1 second linked list in the global graphics memory.

That is, for the second target block, the n thread blocks will store the indexes of the triangles that intersect with the second target block to the second linked list, and the second target block corresponds to one second linked list. Each node in the second linked list corresponds to one warp in a block.

After rounds of computation, the n thread blocks complete the coverage test on all the triangles and the plurality of second blocks, and for each second block, the n thread blocks construct the second linked list.

Schematically, with reference to FIG. 15, the second block has a second linked list, one node in the second linked list includes indexes of q triangles. In order to ensure that an order of obtaining triangles subsequently is not disrupted, the second linked list is kept loose and orderly. The loose and orderly characteristics include: indexes of triangles are stored within a node in descending order of their index values; and within the same first linked list, the index values of the triangles in the preceding node are smaller than those of the triangles in the following node.

With reference to FIG. 15, $\Delta X0<\Delta X1<\Delta X2<<\Delta X(q-1)$; $\Delta X(q-1)<\Delta W0$.

In some embodiments, a thread performs a second coverage test on a triangle and a second block by at least two methods below:

When the length of the bounding box of the triangle in the X-axis direction is less than or equal to 2 pixel grids, columns corresponding to the two pixel grids are directly recorded; and when the length of the bounding box of the triangle in the Y-axis direction is less than or equal to 2 pixel grids, rows corresponding to the two pixel grids are directly recorded.

In this case, whether the triangle covers the second block is not determined by an edge function.

Whether the triangle covers each second block is determined by an edge function.

The basic idea of the method is to represent edges of the triangle by the edge function, determine a position relationship between vertices of the second block and the edges of the triangle by inputting vertex coordinates of the second block, and determine a position relationship between the second block and the triangle after multiple times of determination on the position relationship between the vertices of the second block and the edges of the triangle.

To sum up, the above fully explains a process of performing, by n thread blocks, a second coverage test on a first triangle cluster and a plurality of second blocks, and constructing 1 second linked list for one of the plurality of second blocks.

The second coverage test is performed on n batches of triangles and the plurality of second blocks in parallel through the n thread blocks, thereby improving the efficiency of rasterizing the first triangle cluster. Moreover, each second block stores, through 1 second linked list, the first triangle cluster that intersects with the second block, and the second linked list is kept loose and orderly, so that triangles can still be obtained orderly when fragment data are input to pixels of the second blocks. Furthermore, the quantity of triangles stored in one node of the second linked list corresponds to the quantity of threads included in one warp, which satisfies that one warp corresponds to the triangles of one node when the fragment data are input to the pixels of the second blocks subsequently (when the data are input, one warp is used for one second block), thereby ensuring orderly rasterization.

Next, sub-steps of step 340 above will be introduced:

341. For any triangle in the second triangle cluster corresponding to the second target block, determine an intersection region between the triangle and the second target block.

The computer device queries, in a pre-constructed triangle coverage pixel query table, the intersection region between the triangle and the second target block through edge attributes of the triangle. The edge attributes include slopes of edges of the triangle, intersection points between the edges and boundaries of the second target block, and starting directions of the edges. The triangle coverage pixel query table is used for simulating a position relationship between the triangle and the second target block.

Figure 18:
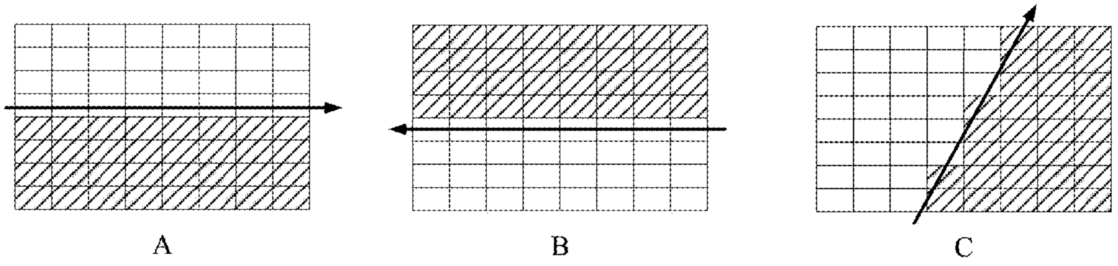
FIG. 18 illustrates a schematic diagram of a method for determining an intersection region between a triangle and a second block according to an exemplary embodiment.

With reference to FIG. 18, the line with an arrow represents an edge of the triangle. For the edge, only the intersection points with the second block, the slope of the edge, and the starting direction of the edge are obtained to determine pixel grids that can be obtained through the edge. By solving an intersection set from the pixel grids obtained from three edges of the triangle, the pixel grids where the triangle intersects with the second block (namely, the intersection region) can be obtained.

In an actual marking process, pixel grids corresponding to one edge of the triangle are marked by writing four attributes and other data. The four attributes include:

FlipY: When FlipY is 0, pixel grids are counted from top to bottom. When FlipY is 1, pixel grids are counted from bottom to top.

FlipX: When FlipX is 0, pixel grids are counted from right to left. When FlipX is 1, pixel grids are counted from left to right.

SwapXY: When SwapXY is equal to 0, counting on pixel grids in the X direction is not limited, but counting on pixel grids in the Y direction is limited (until the edge is counted). When SwapXY is equal to 1, counting on pixel grids in the Y direction is not limited, but counting on pixel grids in the X direction is limited (until the edge is counted).

Comp1: When Comp1 is equal to 0, flipping is not done along the edge according to a way of counting pixel grids in FlipY, FlipX, and SwapXY. When Comp1 is equal to 1, flipping is done along the edge according to a way of counting pixel grids in FlipY, FlipX, and SwapXY.

With reference to FIG. 18, for part A in FIG. 18, the four attributes are FlipX=0, FlipY=0, SwapXY=0, and Comp1=0, respectively; for part B in FIG. 18, the four attributes are FlipX=1, FlipY=0, SwapXY=0, and Comp1=1, respectively; and for part C in FIG. 18, the four attributes are FlipX=0, FlipY=0, SwapXY=1, and Comp1=0, respectively.

4 bits are required to write the foregoing four attributes, and a total of 12 bits are required for the three edges of the triangle. By combining the intersection points of the three edges of the triangle and the axes of the second block, the intersection region between the triangle and the second block can be determined by querying the pre-constructed triangle coverage pixel table.

342. Store fragment data of the intersection region of the triangle to the cache.

The obtained fragment data of the intersection region between the triangle and the second block is stored to the cache. The fragment data include data such as light, material, and coordinates of the triangle.

In one embodiment, after the fragment data of the intersection region of the triangle are stored to the cache, a simple depth determination is further performed. The computer device determines to input the fragment data of the triangle into pixels of the intersection region of the second block based on depth information of the triangle.

In one embodiment, before the computer device inputs the fragment data of the triangle into the pixels of the intersection region of the second block, the computer device obtains a farthest distance (maximum value of z) corresponding to a farthest pixel among all the pixels of the current second block. If a minimum value of z of three vertices of a triangle to be input with fragment data is still greater than the farthest distance of the pixel, the fragment data of the triangle are not written. If a minimum value of z of three vertices of a triangle to be input with fragment data is not greater than the farthest distance of the pixel, the fragment data of the triangle are written.

Schematically, a second block has a size of 8*8, a warp inputs fragment data of a triangle into the second block, and the warp includes 32 threads, so each thread needs to examine two data.

Schematically, z values of all pixels in the second block are detected through following code:

```
tempLate <uint32_t RenderModeFLags>
device_....inline.void update_tile_z_max(uint32_t& tileZMax, booL&
tileZUpd, volatile float4* tileRast, volatile uint32_ t* temp)
{
   if ((RenderModeFLags & (uint32_t) RenderModeFLag:: EnableDepth)≠0
&&_any_sync(FW_ U32_ MAX, tileZUpd)) {
      uint32_t z             =::max(_—float_as_uint(tileRast[threadIdx.x].z),_float_
as_ uint(tileRast[threadIdx.x + 32].z));
   temp[threadIdx.x + 16] = z;
   z                =:: max(z, temp[threadIdx.x + 16 − 1]);
   temp[ threadIdx.x + 16] = z;
   z                      =:: max(z, temp[threadIdx.x + 16 − 2]);
   temp[threadIdx.x + 16] = z;
   z                      =:: max(z, temp[threadIdx.x + 16 − 4]);
   temp[threadIdx.x + 16] = z;
   z                      =:: max(z, temp[threadIdx.x + 16 − 8]);
   temp[threadIdx.x + 16] = z;
   z                      =:: max(z, temp[threadIdx.x + 16 − 16]);
   temp[threadIdx.x + 16] = z;
   tileZMax          =temp[47];
   tileZUpd          =false;
   }
}
```

343. Render the fragment data of the triangle into pixels in the intersection region of the second target block.

In one embodiment, the fragment data corresponding to the triangle with a smaller index are preferentially input when at least two triangles input at least two fragment data to a same pixel in the intersection region.

It may be understood that different fragments obtained by different threads may be written to the same pixel. When different threads write fragment data to a same address, an order of writing the fragment data by the threads is required to be determined. Under hardware regulations, thread 0 writes data before thread 1. Therefore, a write priority of each thread in warps of hardware is required to be detected out, and then an order of obtaining fragments of a corresponding triangle by each thread is defined (namely, the thread for preferential write obtains the fragment data of the triangle with a smaller index). After each thread successfully writes the fragment data, the thread exits the cycle. If the thread fails to write data, the thread writes data to the pixels of the second block again until success.

For example, the foregoing process may be implemented by following code:

```
_ device_— inLine_uint32_ t determine_rop_lane_mask(volatile uint32_t&
warptemp)
{
boot reverselanes = true;
uint32_t mask = (reverseLanes) ? (1u << threadIdx.x) : ~0U;
do {
   warpTemp = threadIdx.x;
   mask =1u<< warpTemp;
} while (warpTemp≠threadIdx.x);
return mask;
}
do {
   rounds++ ;
   CR_TIMER_OUT_ DEP (FineROPConfResolve, rounds);
   CR_ TIMER_ IN(FineROPBLend);
   pRast->Z = _uint_ as_ float (depth);
   pRast->x = rast.x;
   pRast->y = rast.y;
   pRast->w = rast.w;
   pRastDB->x = rastDB.x;
   pRastDB->y = rastDB.y;
   pRastDB->Z = rastDB.z;
   pRastDB->W = rastDB. w;
   CR_ TIMER_ OUT(FineROPBLend);
   CR_ TIMER_ IN(FineROPConfResolve);
} while (depth <_float_as_uint(pRast->z));
do {rounds++ ;
CR_ TIMER_ 0UT_ DEP(F ineROPConfResolve, rounds);
CR_ TIMER_ IN(F ineROPBLend);
pRast->z = _ uint_ as_ float(threadIdx.x);
pRast->x =rast.x;
pRast->y = rast.y;
pRast->W = rast.w;
pRastDB->X = rastDB .x;
pRastDB->y = rastDB.y;
pRastDB->Z = rastDB.z;
pRastDB->W = rastDB.w;
CR_TIMER_ OUT(FineROPBLend);
CR_TIMER _ IN(F ineROPConfResolve);
} while (_ float_ as_ uint(pRast->z) ≠threadIdx.x).
```

To sum up, the foregoing method is provided for inputting fragment data of a triangle in the second triangle cluster into pixels of a second block, and further removing triangles of which a minimum z value of three vertices is still greater than a maximum z value of the pixels of the second block, thereby accelerating rasterization on all triangles.

Based on the optional embodiment shown in FIG. 3, the following steps are further included after step 340.

1. Compute an image difference between a first image and a second image, where the second image is obtained by rendering through an off-line renderer; and back propagate the image difference through a gradient of an error function to the fragment data of the plurality of triangles in the clip space to obtain updated fragment data of the plurality of triangles, where the error function indicates a process of rendering the fragment data of the plurality of triangles to a two-dimensional image.

The first image is a two-dimensional image obtained by the rasterizing method provided by this application, and the second image is a two-dimensional image rendered by the off-line renderer. In one embodiment, the rendering process may be considered as a differentiable function (error function) of inputting fragment data of triangles (a three-dimensional model, light, and maps) and outputting a two-dimensional image. A difference between two-dimensional images (LI loss computed by pytorch, namely, the foregoing difference between the first image and the second image) is computed by pytorch (an open-source Python machine learning library), and is back propagated to the fragment data of the plurality of triangles in the three-dimensional space through the gradient of the error function to obtain the updated fragment data of the plurality of triangles.

Schematically, a chain propagation formula is as follows:

$$\frac{\partial_{err}}{\partial_{pc}} = \frac{\partial_{err}}{\partial_{uc}} * \frac{\partial_{uc}}{\partial_{pc}} + \frac{\partial_{err}}{\partial_{vc}} * \frac{\partial_{vc}}{\partial_{pc}};$$

Where $$\frac{\partial_{err}}{\partial_{uc}} \text{ and } \frac{\partial_{err}}{\partial_{vc}}$$

are intermediate parameters computed by pytorch, and $$\frac{\partial_{uc}}{\partial_{pc}} \text{ and } \frac{\partial_{vc}}{\partial_{pc}}$$

are computed y code. uc refers to a barycentric coordinate system parameter u of a triangle in the clip space, vc is a barycentric coordinate system parameter v of a triangle in the clip space, pc refers to a P point in the clip space coordinate system, and err is a difference between two-dimensional images computed by pytorch.

In short, rasterizing gradient back propagation is a process of propagating a gradient to fragment data in the clip space. Because an automatic gradient propagated by pytorch is relative to the barycentric coordinate system in the clip space, the gradient is required to be manually propagated to the clip space by a chain rule.

$$x_s + 0.5 = \frac{x_c}{w_c} * \frac{\text{width}}{2} + \frac{\text{width}}{2};$$

-continued $$x_s = \left(\frac{2 * x_s}{\text{width}} + \frac{1}{\text{width}} - 1\right) * w;$$

$x_s$ is a point in the screen space, $x_c$ is a point in the clip space, and width, namely, w, is a w component of homogeneous coordinates;

The w (w component of homogeneous coordinates) is derived from perspective-correct interpolation from the screen space directly to the clip space.

$$x_s + 0.5 = x_{ndc} * \frac{\text{width}}{2} + \frac{\text{width}}{2};$$

$$x_{ndc} = \frac{2 * x_s}{\text{width}} + \frac{1}{\text{width}} - 1;$$

$x_{ndc}$ is a point in the normalized device coordinate system;

This application uses the normalized device coordinate system space for transition.

$$u_{ndc} = \frac{e_{21}(x,y)}{A};$$

Coefficients a, b, and c of the edge function are respectively:

$$a = p_{2ndc} \cdot y - p_{1ndc} \cdot y;$$

$$b = p_{1ndc} \cdot x - p_{2ndc} \cdot x;$$

$$c = p_{1ndc} \cdot x * p_{2ndc} \cdot y - p_{1ndc} \cdot y * p_{2ndc} \cdot x.$$

A barycentric coordinate equation of the normalized device coordinate system space may be obtained based on the above. $u_{ndc}$ is a parameter u of the barycentric coordinate system in the normalized device coordinate system space, $e_{21}$(x,y) is an edge of a vertex P2 to a vertex P1 of a triangle, and A is an area of the triangle in the screen space; $P_{2ndc}$.y is a y value of the vertex P2 in the ndc space, $p_{1ndc}$.y is a y value of the vertex P1 in the ndc space, $P_{1ndc}$.x is an x value of the vertex P1 in the ndc space, and P2ndc x is an x value of the vertex P2 in the ndc space.

Obviously, if x and γ are redirected to the origin, both a and b in the equation are canceled, and only term c is left.

$$e_{21}(x', y') = p'_{1ndc} \cdot x * p'_{2ndc} \cdot y - p'_{1ndc} \cdot y \,\&\, p'_{2ndc} \cdot x;$$

$$p'_{1ndc} \cdot x = p_{1ndc} \cdot x - x_{ndc},\ p_{1ndc} \cdot y = p_{1ndc} \cdot y - y_{ndc};$$

$$p'_{2ndc} \cdot x = p_{2ndc} \cdot x - x_{ndc},\ p_{2ndc} \cdot y = p_{2ndc} \cdot y - y_{ndc}.$$

Meanwhile, A is defined as $e_{02}$(x', y')+$e_{21}$(x',y')+$e_{10}$(x',y'). x' is $x_{ndc}$, and Y' is $y_{ndc}$. $e_{02}$(x',y') refers to an edge function of P0P1, $e_{21}$(x',y') refers to an edge function of P2P1, and $e_{10}$(x', y') refers to an edge function of P1P0.

After x and y are redirected to the origin, a simplified form of u and A is as follows:

$$b2 = 1 - b0 - b2;$$

-continued $$f[ca0, ca1, ca2] := \frac{\frac{ca0*b0}{cw0}+\frac{ca1*b1}{cw1}+\frac{ca2*b2}{cw2}}{\frac{b0}{cw0}\frac{b1}{cw1}+\frac{b2}{cw2}}.$$

From mathematical operations, it can be proven that both the edge function of the parameter u constituting the barycentric coordinate system from the normalized device coordinate system space to the clip space and the area A of the triangle undergo perspective division. Through the foregoing simplified form of u and A, the w to be interpolated is transformed to w of a per-vertex, which enables smooth back propagation.

Properties of the barycentric coordinate system are b0+b1+b2=1; ca0, ca1, and ca2 are general representations of vertex attributes of vertices P0, P1, and P2, and may be expressed as position, color, texture coordinates, and the like; and cw0, cw1, and cw2 represent w components of the homogeneous coordinate system of vertices P0, P1, and P2 in the clip space, respectively.

2. Render the first image again based on the updated fragment data of the plurality of triangles.

To sum up, the foregoing method provides steps to support back propagation of differentiable rendering, where the differentiable rendering improves the authenticity of the final two-dimensional image, with excellent performance.

Next, practice effects of the soft rasterizing method according to an exemplary embodiment of this application are introduced.

Figure 19:
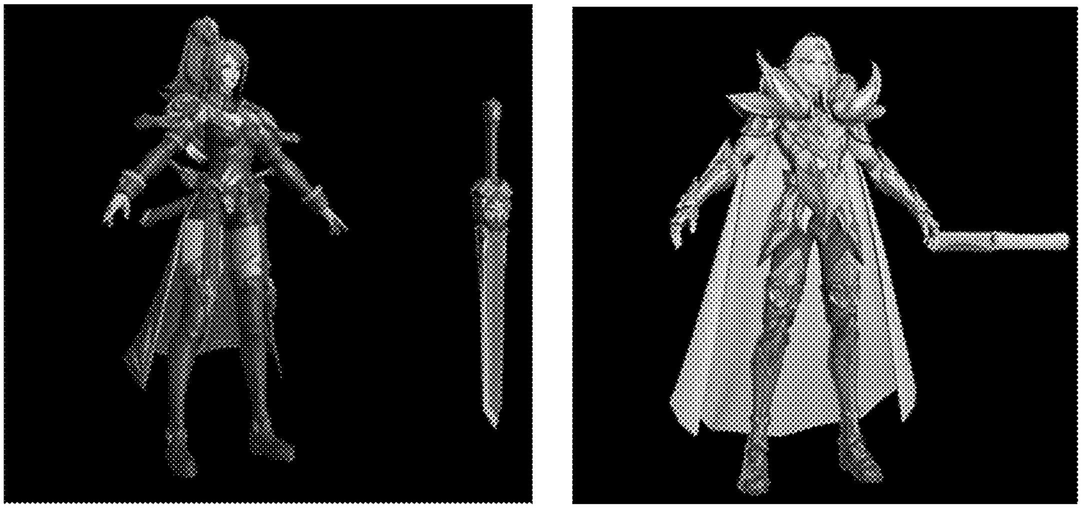
FIG. 19 illustrates a schematic diagram of an implementation effect of the soft rasterizing method according to an exemplary embodiment.

With reference to FIG. 19, both part A and part B of FIG. 19 indicate that the soft rasterizing method provided by this application can complete forward rendering and reverse gradient propagation of complex three-dimensional models, with rendering effects highly consistent with hardware implementation.

Figure 20:
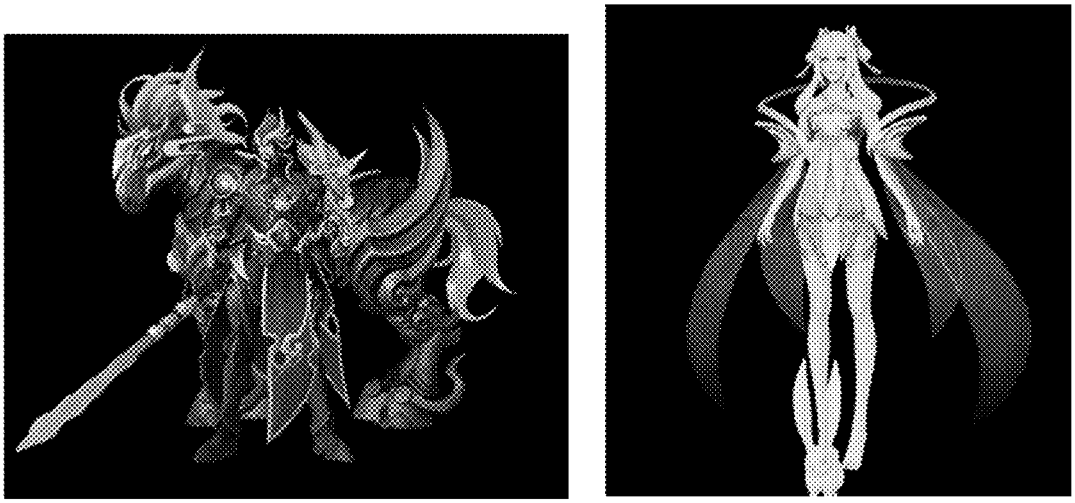
FIG. 20 illustrates a schematic diagram of an implementation effect of the soft rasterizing method according to another exemplary embodiment.

With reference to FIG. 20, part a of FIG. 20 indicates that the soft rasterizing method provided by this application supports conventional skinned animation; and part b of FIG. 20 indicates that the soft rasterizing method provided by this application supports semi-transparent complex materials.

Figure 21:
FIG. 21 illustrates a schematic diagram of an implementation effect of the soft rasterizing method according to another exemplary embodiment.
Figure 22:
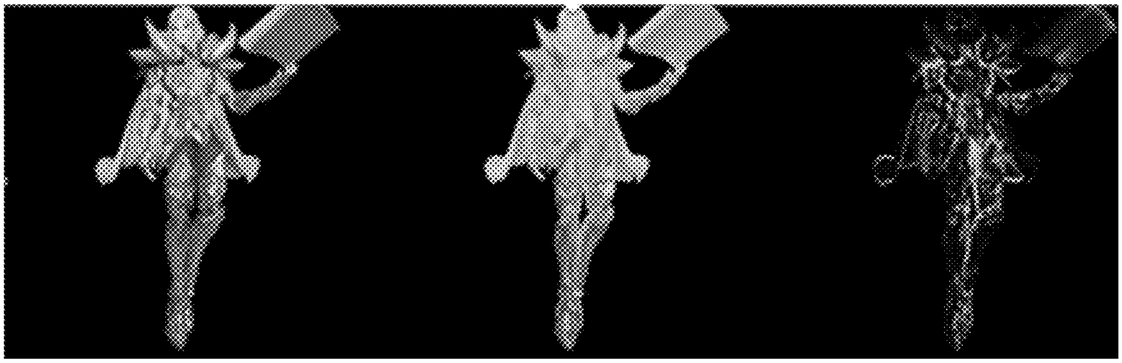
FIG. 22 illustrates a schematic diagram of an implementation effect of the soft rasterizing method according to another exemplary embodiment.
Figure 23:
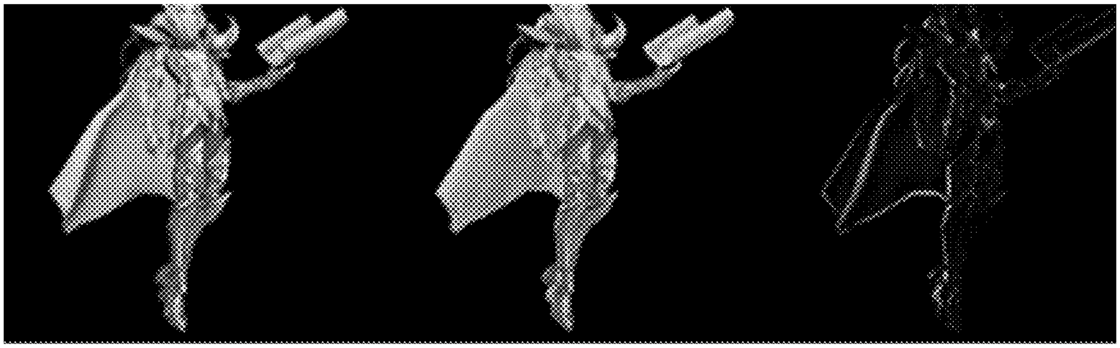
FIG. 23 illustrates a schematic diagram of an implementation effect of the soft rasterizing method according to another exemplary embodiment.

Refer to FIGS. 21, 22, and 23. Part a in FIGS. 21, 22, and 23 shows a two-dimensional image of physically based rendering (PBR), where the rendering process requires a lot of computing resources; and part b in FIGS. 21, 22, and 23 shows a two-dimensional image obtained by rendering only one map in this application without excessive computation.

Part c of FIG. 21 shows a difference between part a of FIG. 21 and a two-dimensional image rendered by the soft rasterizing method provided in this application when ephch (iteration process) is equal to 0 (thermodynamic diagram); part c of FIG. 22 shows a difference between part a of FIG. 22 and a two-dimensional image rendered by the soft rasterizing method provided in this application when ephch is equal to 10 (thermodynamic diagram); and part c of FIG. 23 shows a difference between part a of FIG. 23 and a two-dimensional image rendered by the soft rasterizing method provided in this application when ephch is equal to 100 (thermodynamic diagram).

Obviously, the soft rasterizer provided in this application has stronger learning ability and supports rendering effects that are very close to physical rendering. In addition, the soft rasterizer introduced in this application can efficiently simulate a rendering process of a GPU. After testing, an RTX2080 graphics card (graphics card model) having a 1024*1024 resolution rasterizes 600000 triangles with 1.8 million vertices for less than 1 ms.

Figure 24:
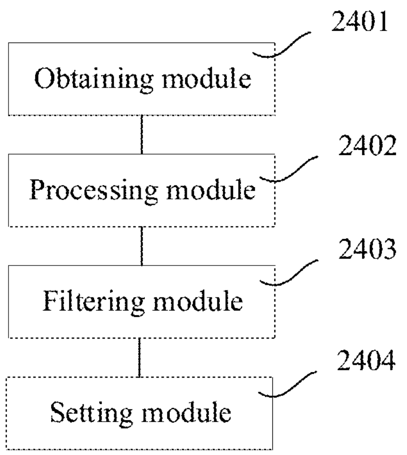
FIG. 24 illustrates a structural block diagram of a soft rasterizing apparatus according to an exemplary embodiment.

FIG. 24 is a structural block diagram of a soft rasterizing apparatus according to an exemplary embodiment of this application. The apparatus includes:

an obtaining module 2401, configured to obtain primitive data of a plurality of triangles of a three-dimensional model in a three-dimensional space;

a processing module 2402, configured to perform a first coverage test on the plurality of triangles and a plurality of first blocks of a camera viewport through n thread blocks to obtain first data corresponding to the plurality of first blocks respectively, where the first data includes primitive data of a first triangle cluster that intersects with the first blocks, the plurality of first blocks are obtained by dividing the camera viewport, and n is a positive integer;

the processing module 2402, further configured to perform a second coverage test on a first triangle cluster of a first target block and a plurality of second blocks through n thread blocks based on the first data to obtain second data corresponding to the plurality of second blocks respectively, where the second data includes primitive data of a second triangle cluster that intersects with the second blocks, the plurality of second blocks are obtained by dividing the first target block, the second triangle cluster is a subset of the first triangle cluster, and the first target block is any one of the plurality of first blocks; and a rendering module 2403, configured to render triangles in the second triangle cluster of a second target block to pixels in the second target block, the second target block being any one of the plurality of second blocks.

In some embodiments, the processing module 2402 is further configured to perform the first coverage test on the plurality of triangles and the plurality of first blocks of the camera viewport in parallel through the n thread blocks to determine the primitive data of the first triangle cluster that intersects with the first target block, and store in parallel, through the n thread blocks, triangles that intersect with the first target block, to obtain n first linked lists corresponding to the first target block.

In a single round of parallel computation, one of the n thread blocks processes p*q triangles among the plurality of triangles, an $i^{th}$ first linked list among the n first linked lists is used for storing first coverage test results of an $i^{th}$ block, the $i^{th}$ first linked list includes at least one node, and the node stores index data of the p*q triangles that intersect with the first target block. The n thread blocks determine, through rounds of computation, the first triangle cluster that intersects with the first target block, where i is a positive integer not greater than n.

In some embodiments, the first coverage test includes a producer stage and a consumer stage; and the processing module 2402 is further configured in the producer stage to upload n batches of triangles from a global graphics memory to a cache through the n thread blocks in the single round of parallel computation, a batch of triangles including p*q triangles among the plurality of triangles, in the consumer stage to perform the first coverage test on the n batches of triangles and the plurality of first blocks through then thread blocks in the single round of parallel computation, and to store in parallel, through the n thread blocks, indexes of the plurality of triangles that intersect with the first target block to the n first linked lists of the first target block, where there is a one-to-one corresponding relationship between the n thread blocks and the n first linked lists.

In some embodiments, the block includes p warps, and the warp includes q threads; and the processing module 2402 is further configured in the consumer stage to perform, for the $i^{th}$ block among the n thread blocks, the first coverage test on an $i^{th}$ batch of triangles among the n batches and the plurality of first blocks through p*q threads in the $i^{th}$ block in the single round of parallel computation to obtain a first coverage template, where the first coverage template stores the number and indexes of triangles that intersect with each first block.

In some embodiments, the processing module 2402 is further configured to store, in the single round of parallel computation, the indexes of the plurality of triangles that intersect with the first target block to one node of the $i^{th}$ first linked list through the $i^{th}$ block in a first to-be-processed linked list space, where the $i^{th}$ block corresponds to the $i^{th}$ batch of triangles, and the first to-be-processed linked list space is a storage space used for storing one node of the $i^{th}$ first linked list in the global graphics memory.

In some embodiments, the processing module 2402 is further configured to allocate a second linked list space to the first target block through processing threads in the $i^{th}$ block when a remaining capacity of an allocated first linked list space fails to accommodate the indexes of the plurality of triangles determined by the $i^{th}$ block that intersect with the first target block, and to determine that the second linked list space is the first to-be-processed linked list space, where the plurality of threads in the $i^{th}$ block correspond to the plurality of first blocks one to one.

In some embodiments, the processing module 2402 is further configured to determine through processing threads in the $i^{th}$ block that the first linked list space is the first to-be-processed linked list space when a remaining capacity of an allocated first linked list space is enough to accommodate the indexes of the plurality of triangles determined by the $i^{th}$ block that intersect with the first target block, where the plurality of threads in the $i^{th}$ block correspond to the plurality of first blocks one to one.

In some embodiments, the block includes p warps, and the warp includes q threads; and the processing module 2402 is further configured in the producer stage to determine, for the $i^{th}$ block among the n thread blocks, a storage location of a triangle to be processed by each thread in the $i^{th}$ block in the cache through a synchronous voting mechanism for warps and inclusive scanning of the $i^{th}$ block in the single round of parallel computation, and upload the $i^{th}$ batch of triangles from the global graphics memory to the cache through the threads in the $i^{th}$ block, the $i^{th}$ batch of triangles including p*q triangles among the plurality of triangles.

In some embodiments, the processing module 2402 is further configured to perform the second coverage test on the first triangle cluster and the plurality of second blocks in parallel through then thread blocks to determine primitive data of the second triangle cluster that intersects with the second target block, and store in parallel, through the n thread blocks, triangles that intersect with the second target block, to obtain 1 second linked list corresponding to the second target block.

In the single round of parallel computation, one of then thread blocks processes p*q triangles in the first triangle cluster, the second linked list includes at least one node, and the node stores index data of q triangles that intersect with the second target block. The n thread blocks determine, through rounds of computation, the second triangle cluster that intersects with the second target block.

In some embodiments, the second coverage test includes a producer stage and a consumer stage; and the processing module 2402 is further configured in the producer stage to upload then batches of triangles from the global graphics memory to the cache through the n thread blocks in the single round of parallel computation, a batch of triangles including p*q triangles in the first triangle cluster, and in the consumer stage to perform the second coverage test on the n batches of triangles and the plurality of second blocks through the n thread blocks in the single round of parallel computation.

In some embodiments, the processing module 2402 is further configured to store indexes of the plurality of triangles that intersect with the second target block to the 1 second linked list of the second target block in parallel through the n thread blocks.

In some embodiments, the block includes p warps, and the warp includes q threads.

In some embodiments, the processing module 2402 is further configured in the consumer stage to perform, for the $i^{th}$ block among the n thread blocks, the second coverage test on the $i^{th}$ batch of triangles among the n batches and the plurality of second blocks through the p*q threads in the $i^{th}$ block in the single round of parallel computation to obtain a second coverage template, where the second coverage template stores the number and indexes of triangles that intersect with each second block.

In some embodiments, the processing module 2402 is further configured to store, in the single round of parallel computation, the indexes of the plurality of triangles that intersect with the second target block to one node of the 1 second linked list through the $i^{th}$ block in a second to-be-processed linked list space, where the $i^{th}$ block corresponds to the $i^{th}$ batch of triangles, and the second to-be-processed linked list space is a storage space used for storing one node of the 1 second linked list in the global graphics memory.

In some embodiments, the processing module 2402 is further configured to allocate a fourth linked list space to the second target block through the processing threads in the $i^{th}$ block when a remaining capacity of an allocated third linked list space fails to accommodate the indexes of the plurality of triangles determined by the $i^{th}$ block that intersect with the second target block, and to determine that the fourth linked list space is the second to-be-processed linked list space, where the plurality of threads in the $i^{th}$ block correspond to the plurality of second blocks one to one; or determine through the processing threads in the $i^{th}$ block that the first linked list space is the second to-be-processed linked list space when a remaining capacity of an allocated third linked list space is enough to accommodate the indexes of the plurality of triangles determined by the $i^{th}$ block that intersect with the second target block, where the plurality of threads in the $i^{th}$ block correspond to the plurality of second blocks one to one.

In some embodiments, the rendering module 2403 is further configured to determine, for any triangle in the second triangle cluster corresponding to the second target block, an intersection region between the triangle and the second target block; and store fragment data of the intersection region of the triangle to the cache. In some embodiments, the rendering module 2403 is further configured to render the fragment data of the triangle into pixels in the intersection region of the second target block.

In some embodiments, the rendering module 2403 is further configured to query, in a pre-constructed triangle coverage pixel query table, the intersection region between the triangle and the second target block through edge attributes of the triangle, where the triangle coverage pixel query table is used for simulating a position relationship between the triangle and the second target block, and the edge attributes include slopes of edges of the triangle, intersection points between the edges and boundaries of the second target block, and starting directions of the edges.

In some embodiments, the rendering module 2403 is further configured to preferentially input the fragment data corresponding to the triangle with a smaller index when at least two triangles input at least two fragment data to a same pixel in the intersection region.

In some embodiments, the obtaining module 2401 is further configured to filter the plurality of triangles according to the primitive data of the plurality of triangles, where filtering the plurality of triangles includes at least one of the following steps:

removing triangles outside the camera viewport from the plurality of triangles of the three-dimensional model;

clipping triangles with sub-regions located within the camera viewport from the plurality of triangles of the three-dimensional model; and removing triangles, bounding boxes of which are not greater than a pixel and do not cover diagonal points of the pixel, from the plurality of triangles of the three-dimensional model.

In some embodiments, the obtaining module 2401 stores the primitive data of the plurality of selected triangles to the global graphics memory through an adaptive linked list, where when one edge triangle among the plurality of triangles after filtering is clipped to at least one sub-triangle, a rear segment of the adaptive linked list stores at least one node corresponding to the at least one sub-triangle, a front segment of the adaptive linked list stores nodes in one-to-one correspondence to the plurality of triangles before being clipped, nodes of the edge triangle store pointers to the at least one node, the nodes of the adaptive linked list store the primitive data of the triangles, and the primitive data of the triangles include vertex coordinates of the triangles.

In some embodiments, the processing module 2402 is further configured to obtain an interpolation plane equation for the triangles according to a perspective-correct interpolation algorithm, and update the fragment data of the plurality of triangles according to the interpolation plane equation, where the interpolation plane equation is used for correcting errors caused by transforming the plurality of triangles from a clip space to a normalized device coordinate system space.

In some embodiments, the processing module 2402 is further configured to compute an image difference between a first image and a second image, where the second image is obtained by rendering through an off-line renderer; back propagate the image difference through a gradient of an error function to the fragment data of the plurality of triangles in the clip space to obtain updated fragment data of the plurality of triangles, where the error function indicates a process of rendering the fragment data of the plurality of triangles to a two-dimensional image; and render the first image again based on the updated fragment data of the plurality of triangles.

In some embodiments, the apparatus further includes a setting module 2404 configured to set at least one of a quantity of blocks n, a quantity of warps p included in each block, and a quantity of threads q included in each warp based on a quantity of the plurality of triangles.

To sum up, this application provides a soft rasterizing method, which can overcome a defect that hardware rasterization not supporting open-source operations cannot modify rasterizing parameters according to actual rendering requirements. The soft rasterizer is not limited to inherent hardware and rendering interfaces, and can easily and flexibly complete distribution and deployment of distributed and heterogeneous rendering tasks.

In addition, a hierarchical rasterizing process is provided by performing a first coverage test on a plurality of triangles and a plurality of first blocks through n thread blocks, performing, for one of the plurality of first blocks, a second coverage test on a first triangle cluster that intersects with the first block and a plurality of second blocks that are obtained by dividing the first blocks, and rendering, for one of the plurality of second blocks, fragment data of a second triangle cluster that intersects with the second block to the second target block, thereby improving rasterizing efficiency.

Moreover, the apparatus can overcome the defect that hardware rasterization not supporting open-source operations cannot modify rasterizing parameters according to actual rendering requirements. In a hardware rasterizer, quantities of warps and threads used for rasterizing triangles are fixed. When many triangles are required to be rasterized, use of fewer threads for rasterizing reduces rasterizing efficiency. When a few triangles are required to be rasterized, use of more threads for rasterizing wastes computer resources.

Figure 25:
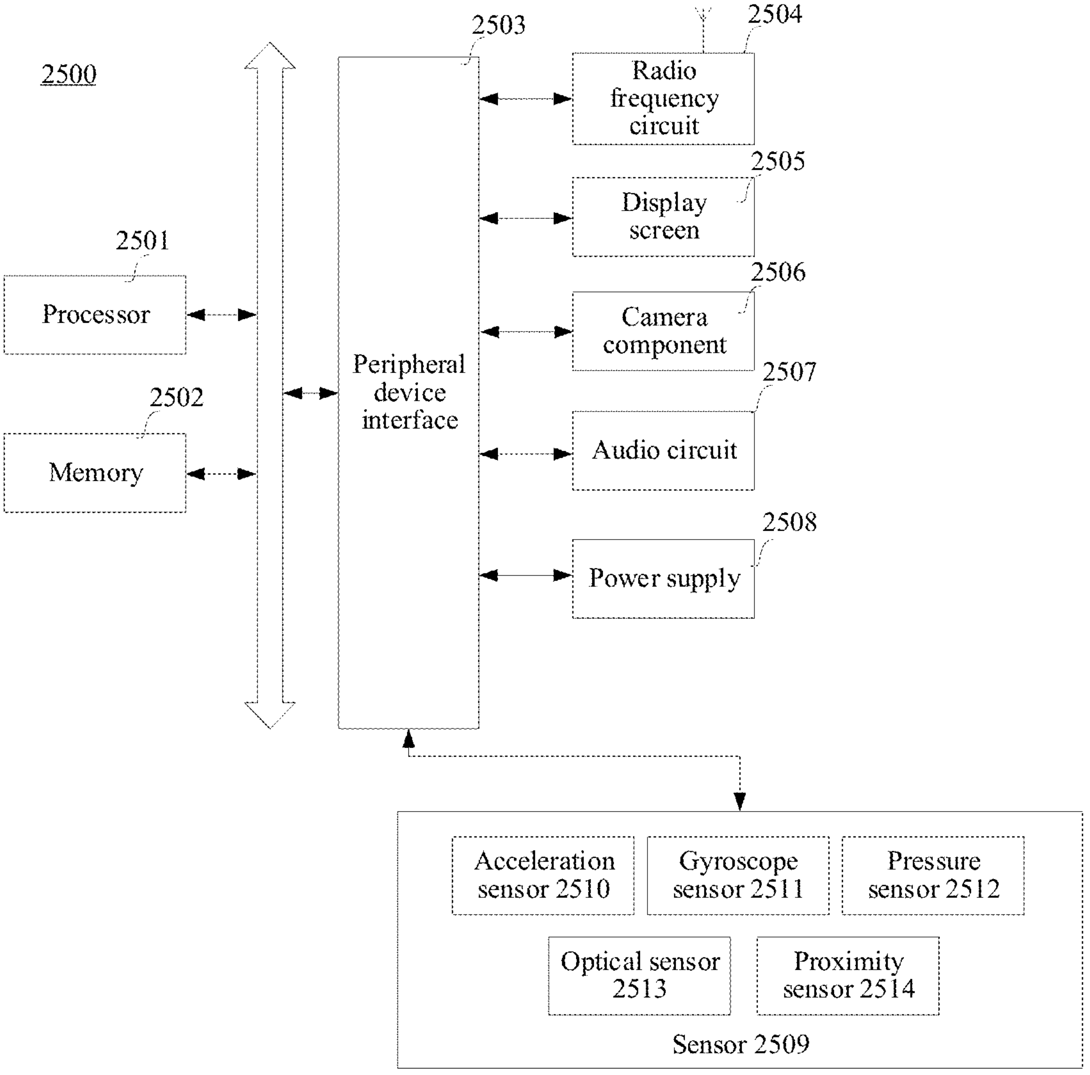
FIG. 25 illustrates a structural block diagram of a computer device according to an exemplary embodiment.

FIG. 25 illustrates a schematic structural diagram of a computer device 2500 according to an exemplary embodiment of this application. The computer device 2500 may be a portable mobile terminal, such as a smart phone, a tablet computer, a moving picture experts group audio layer III (MP3) player, a moving picture experts group audio layer III) player, a moving picture experts group audio layer IV (MP4) player, a notebook computer, or a desktop computer. The computer device 2500 may also be referred to as another name such as user equipment, a portable terminal, a laptop terminal, or a desktop terminal. Generally, the computer device 2500 includes: a processor 2501 and a memory 2502.

The processor 2501 may include one or more processing cores, for example, a 4-core processor or an 8-core processor. The processor 2501 may be implemented in at least one hardware form of a digital signal processor (DSP), a field-programmable gate array (FPGA), and a programmable logic array (PLA). The processor 2501 may alternatively include a main processor and a coprocessor. The main processor is a processor configured to process data in an awake state, and is also referred to as a central processing unit (CPU). The coprocessor is a low power consumption processor configured to process data in a standby state. In some embodiments, the processor 2501 may be integrated with a graphics processing unit (GPU). The GPU is configured to render and draw content to be displayed on a display screen. In some embodiments, the processor 2501 may further include an artificial intelligence (AI) processor. The AI processor is configured to process computing operations related to machine learning.

The memory 2502 may include one or more computer-readable storage media. The computer-readable storage medium may be non-transitory. The memory 2502 may further include a high-speed random access memory and a nonvolatile memory, for example, one or more disk storage devices or flash storage devices. In some embodiments, the non-transitory computer-readable storage medium in the memory 2502 is used for storing at least one instruction, and the at least one instruction is executed by the processor 2501 to implement the soft rasterizing method provided by the method embodiments of this application.

In some embodiments, the computer device 2500 may further include: a peripheral device interface 2503 and at least one peripheral device. The processor 2501, the memory 2502, and the peripheral device interface 2503 may be connected through a bus or a signal cable. Each peripheral device may be connected to the peripheral device interface 2503 through a bus, a signal cable, or a circuit board. For example, the peripheral device may include: at least one of a radio frequency (RF) circuit 2504, a display screen 2505, a camera component 2506, an audio circuit 2507, and a power supply 2508.

The peripheral interface 2503 may be configured to connect the at least one peripheral related to input/output (I/O) to the processor 2501 and the memory 2502. The RF circuit 2504 is configured to receive and transmit an RF signal, also referred to as an electromagnetic signal. The display screen 2505 is configured to display a user interface (UI). The UI may include a graph, text, an icon, a video, and any combination thereof. The camera component 2506 is configured to capture images or videos. The audio circuit 2507 may include a microphone and a speaker. The power supply 2508 is configured to supply power to components in the computer device 2500.

In some embodiments, the computer device 2500 further includes one or more sensors 2509. The one or more sensors 2509 include but are not limited to: an acceleration sensor 2510, a gyroscope sensor 2511, a pressure sensor 2512, an optical sensor 2513, and a proximity sensor 2514.

The acceleration sensor 2510 may detect a magnitude of acceleration on three coordinate axes of a coordinate system established by the computer device 2500. The gyroscope sensor 2511 may detect a body direction and a rotation angle of the computer device 2500. The gyroscope sensor 2511 may cooperate with the acceleration sensor 2510 to collect a 3D action by the user on the computer device 2500. The pressure sensor 2512 may be disposed at a side frame of the computer device 2500 and/or a lower layer of the display screen 2505. The optical sensor 2513 is configured to collect ambient light intensity. The proximity sensor 2514, also referred to as a distance sensor, is generally disposed on a front panel of the computer device 2500. The proximity sensor 2514 is configured to collect a distance between a user and a front side of the computer device 2500.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. A person skilled in the art may understand that the structure shown in FIG. 25 constitutes no limitation on the computer device 2500, and the computer device may include more or fewer components than those shown in the figure, or some components may be combined, or a different component deployment may be used.

This application further provides a non-transitory computer-readable storage medium, the storage medium storing at least one instruction, at least one program, a code set, or an instruction set, and the at least one instruction, the at least one program, the code set, or the instruction set being loaded and executed by a processor to implement the soft rasterizing method provided in the foregoing method embodiments.

This application provides a computer program product or a computer program, the computer program product or the computer program including computer instructions, and the computer instructions being stored in a computer-readable storage medium. A processor of a computer device reads the computer instructions from the computer-readable storage medium, the processor executes the computer instructions, and the computer device is enabled to execute the soft rasterizing method provided in the foregoing method embodiments.

What is claimed is:

1. A rasterizing method performed by a computer device, the method comprising:

obtaining primitive data of a plurality of triangles of a three-dimensional model in a three-dimensional space;

performing a first coverage test on the plurality of triangles and a plurality of first blocks of a camera viewport through n thread blocks to obtain first data corresponding to the plurality of first blocks respectively, the first data comprising primitive data of a first triangle cluster that intersects with a respective one of the first blocks, and n being a positive integer;

performing a second coverage test on the first triangle cluster of a first target block among the plurality of first blocks and a plurality of second blocks of the first target block through the n thread blocks based on the first data to obtain second data corresponding to the plurality of second blocks respectively, the second data comprising primitive data of a second triangle cluster that intersects with a respective one of the second blocks, the second triangle cluster being a subset of the first triangle cluster, and the plurality of second blocks are obtained by dividing the first target block;

rendering triangles in the second triangle cluster of a second target block to pixels in the second target block, the second target block being any one of the plurality of second blocks; and allocating a linked list space to the first target block through processing threads in a ith block when a remaining capacity of an allocated first linked list space fails to accommodate indexes of the plurality of triangles determined by the ith block that intersect with the first target block, and determining that the linked list space is a first to-be-processed linked list space, wherein a plurality of threads in the ith block correspond to the plurality of first blocks one to one.

2. The method according to claim 1, wherein the performing the first coverage test on the plurality of triangles and the plurality of first blocks of the camera viewport through the n thread blocks to obtain the first data corresponding to the plurality of first blocks respectively comprises:

performing the first coverage test on the plurality of triangles and the plurality of first blocks of the camera viewport in parallel through the n thread blocks to determine the primitive data of the first triangle cluster that intersects with the first target block; and storing in parallel, through the n thread blocks, triangles that intersect with the first target block, to obtain n first linked lists corresponding to the first target block;

wherein in a single round of parallel computation, one of the n thread blocks processes p*q triangles among the plurality of triangles, an ith first linked list among the n first linked lists is used for storing first coverage test results of an ith block, the ith first linked list comprises at least one node, and the node stores index data of the p*q triangles that intersect with the first target block; and wherein the n thread blocks determine, through rounds of computation, the first triangle cluster that intersects with the first target block, wherein i is a positive integer not greater than n; n, p, and q are positive integers; and p*q represents a product of p and q.

3. The method according to claim 2, wherein the first coverage test comprises a producer stage and a consumer stage;

the performing the first coverage test on the plurality of triangles and the plurality of first blocks of the camera viewport in parallel through the n thread blocks comprises:

uploading, in the producer stage, n batches of triangles from a global graphics memory to a cache through the n thread blocks in the single round of parallel computation, a batch of triangles comprising p*q triangles among the plurality of triangles, and performing, in the consumer stage, the first coverage test on the n batches of triangles and the plurality of first blocks through the n thread blocks in the single round of parallel computation; and the storing in parallel, through the n thread blocks, triangles that intersect with the first target block, to obtain the n first linked lists corresponding to the first target block comprises:

storing in parallel, through the n thread blocks, indexes of the plurality of triangles that intersect with the first target block to the n first linked lists of the first target block, wherein there is a one-to-one corresponding relationship between the n thread blocks and the n first linked lists.

4. The method according to claim 3, wherein each of the thread blocks comprises p warps, and each warp comprises q threads;

the performing, in the consumer stage, the first coverage test on the n batches of triangles and the plurality of first blocks through the n thread blocks in the single round of parallel computation comprises:

performing, in the consumer stage, for the ith block among the n thread blocks, the first coverage test on an ith batch of triangles among the n batches and the plurality of first blocks through p*q threads in the ith block in the single round of parallel computation to obtain a first coverage template, wherein the first coverage template stores a number and indexes of triangles that intersect with each first block; and the storing in parallel, through the n thread blocks, the indexes of the plurality of triangles that intersect with the first target block to the n first linked lists of the first target block comprises:

storing, in the single round of parallel computation, the indexes of the plurality of triangles that intersect with the first target block to one node of the ith first linked list through the ith block in a first to-be-processed linked list space, wherein the ith block corresponds to the ith batch of triangles, and the first to-be-processed linked list space is a storage space used for storing one node of the ith first linked list in the global graphics memory.

5. The method according to claim 4, wherein the linked list space is a second linked list space to the first target block; and determining through processing threads in the ith block that the first linked list space is the first to-be-processed linked list space when a remaining capacity of an allocated first linked list space is enough to accommodate the indexes of the plurality of triangles determined by the ith block that intersect with the first target block, wherein the plurality of threads in the ith block correspond to the plurality of first blocks one to one.

6. The method according to claim 3, wherein each of the thread blocks comprises p warps, and each warp comprises q threads;

the uploading, in the producer stage, the n batches of triangles from the global graphics memory to the cache through the n thread blocks in the single round of parallel computation comprises:

determining, in the producer stage, for the ith block among the n thread blocks, a storage location of a triangle to be processed by each thread in the ith block in the cache through a synchronous voting mechanism for warps and inclusive scanning of the ith block in the single round of parallel computation; and uploading an ith batch of triangles from the global graphics memory to the cache through the threads in the ith block, the ith batch of triangles comprising p*q triangles among the plurality of triangles.

7. The method according to claim 1, wherein the performing the second coverage test on the first triangle cluster and the plurality of second blocks through the n thread blocks to obtain the second data corresponding to the plurality of second blocks respectively comprises:

performing the second coverage test on the first triangle cluster and the plurality of second blocks in parallel through the n thread blocks to determine primitive data of the second triangle cluster that intersects with the second target block; and storing in parallel, through the n thread blocks, triangles that intersect with the second target block, to obtain 1 second linked list corresponding to the second target block;

wherein in a single round of parallel computation, one of the n thread blocks processes p*q triangles in the first triangle cluster, the second linked list comprises at least one node, and the node stores index data of q triangles that intersect with the second target block; and wherein the n thread blocks determine, through rounds of computation, the second triangle cluster that intersects with the second target block, wherein n, p, and q are positive integers.

8. The method according to claim 7, wherein the second coverage test comprises a producer stage and a consumer stage;

the performing the second coverage test on the first triangle cluster and the plurality of second blocks in parallel through the n thread blocks comprises:

uploading, in the producer stage, n batches of triangles from a global graphics memory to a cache through then thread blocks in the single round of parallel computation, a batch of triangles comprising p*q triangles in the first triangle cluster, and performing, in the consumer stage, the second coverage test on the n batches of triangles and the plurality of second blocks through the n thread blocks in the single round of parallel computation; and the storing in parallel, through the n thread blocks, triangles that intersect with the second target block, to obtain the 1 second linked list corresponding to the second target block comprises:

storing indexes of the plurality of triangles that intersect with the second target block to the 1 second linked list of the second target block in parallel through then thread blocks.

9. The method according to claim 8, wherein each of the thread blocks comprises p warps, and each warp comprises q threads;

the performing, in the consumer stage, the second coverage test on the n batches of triangles and the plurality of second blocks through the n thread blocks in the single round of parallel computation comprises:

performing, in the consumer stage, for the ith block among the n thread blocks, the second coverage test on ith batch of triangles among the n batches and the plurality of second blocks through the p*q threads in the ith block in the single round of parallel computation to obtain a second coverage template, wherein the second coverage template stores a number and indexes of triangles that intersect with each second block; and the storing indexes of the plurality of triangles that intersect with the second target block to the 1 second linked list of the second target block in parallel through the n thread blocks comprises:

storing, in the single round of parallel computation, the indexes of the plurality of triangles that intersect with the second target block to one node of the 1 second linked list through the ith block in a second to-be-processed linked list space, wherein the ith block corresponds to the ith batch of triangles, and the second to-be-processed linked list space is a storage space used for storing one node of the 1 second linked list in the global graphics memory.

10. The method according to claim 9, wherein the method further comprises:

allocating a fourth linked list space to the second target block through processing threads in the ith block when a remaining capacity of an allocated third linked list space fails to accommodate the indexes of the plurality of triangles determined by the ith block that intersect with the second target block, and determining that the fourth linked list space is the second to-be-processed linked list space, wherein a plurality of threads in the ith block correspond to the plurality of second blocks one to one; or determining through the processing threads in the ith block that the first linked list space is the second to-be-processed linked list space when a remaining capacity of an allocated third linked list space is enough to accommodate the indexes of the plurality of triangles determined by the ith block that intersect with the second target block, wherein the plurality of threads in the ith block correspond to the plurality of second blocks one to one.

11. The method according to claim 1, wherein the rendering triangles in the second triangle cluster of the second target block to pixels in the second target block comprises:

determining, for any triangle in the second triangle cluster corresponding to the second target block, an intersection region between the triangle and the second target block;

storing fragment data of the intersection region of the triangle to a cache; and rendering the fragment data of the triangle into pixels in the intersection region of the second target block.

12. The method according to claim 11, wherein the determining the intersection region between the triangle and the second target block comprises:

querying, in a pre-constructed triangle coverage pixel query table, the intersection region between the triangle and the second target block through edge attributes of the triangle, wherein the triangle coverage pixel query table is used for simulating a position relationship between the triangle and the second target block, and the edge attributes comprise slopes of edges of the triangle, intersection points between the edges and boundaries of the second target block, and starting directions of the edges.

13. The method according to claim 11, wherein the rendering the fragment data of the triangle into pixels in the intersection region of the second target block comprises:

preferentially inputting the fragment data corresponding to the triangle with a smaller index when at least two triangles input at least two fragment data to a same pixel in the intersection region.

14. The method according to claim 1, wherein before the performing the first coverage test on the plurality of triangles and the plurality of first blocks of the camera viewport through the n thread blocks to obtain the first data corresponding to the plurality of first blocks respectively, the method further comprises:

filtering the plurality of triangles of the three-dimensional model in the three-dimensional space by:

removing triangles outside the camera viewport from the plurality of triangles of the three-dimensional model;

clipping triangles with sub-regions located within the camera viewport from the plurality of triangles of the three-dimensional model; and removing triangles, bounding boxes of which are not greater than a pixel and do not cover diagonal points of the pixel, from the plurality of triangles of the three-dimensional model.

15. The method according to claim 1, wherein the method further comprises:

computing an image difference between a first image rendered by the method and a second image, wherein the second image is obtained by rendering through an off-line renderer;

back propagating the image difference through a gradient of an error function to obtain updated fragment data of the plurality of triangles in a clip space, wherein the error function indicates a process of rendering the fragment data of the plurality of triangles to a two-dimensional image; and updating the first image based on the updated fragment data of the plurality of triangles.

16. A computer device, comprising: a processor and a memory, the memory storing a computer program, and the computer program being loaded and executed by the processor and causing the computer device to implement a rasterizing method including:

obtaining primitive data of a plurality of triangles of a three-dimensional model in a three-dimensional space;

performing a first coverage test on the plurality of triangles and a plurality of first blocks of a camera viewport through n thread blocks to obtain first data corresponding to the plurality of first blocks respectively, the first data comprising primitive data of a first triangle cluster that intersects with a respective one of the first blocks, and n being a positive integer;

performing a second coverage test the first triangle cluster of a first target block among the plurality of first blocks and a plurality of second blocks of the first target block through the n thread blocks based on the first data to obtain second data corresponding to the plurality of second blocks respectively, the second data comprising primitive data of a second triangle cluster that intersects with a respective one of the second blocks, the second triangle cluster being a subset of the first triangle cluster, and the plurality of second blocks are obtained by dividing the first target block;

rendering triangles in the second triangle cluster of a second target block to pixels in the second target block, the second target block being any one of the plurality of second blocks; and allocating a linked list space to the first target block through processing threads in a ith block when a remaining capacity of an allocated first linked list space fails to accommodate indexes of the plurality of triangles determined by the ith block that intersect with the first target block, and determining that the linked list space is a first to-be-processed linked list space, wherein a plurality of threads in the ith block correspond to the plurality of first blocks one to one.

17. The computer device according to claim 16, wherein the rendering triangles in the second triangle cluster of the second target block to pixels in the second target block comprises:

determining, for any triangle in the second triangle cluster corresponding to the second target block, an intersection region between the triangle and the second target block;

storing fragment data of the intersection region of the triangle to a cache; and rendering the fragment data of the triangle into pixels in the intersection region of the second target block.

18. The computer device according to claim 16, wherein before the performing the first coverage test on the plurality of triangles and the plurality of first blocks of a camera viewport through the n thread blocks to obtain the first data corresponding to the plurality of first blocks respectively, the method further comprises:

filtering the plurality of triangles of the three-dimensional model in the three-dimensional space by:

removing triangles outside the camera viewport from the plurality of triangles of the three-dimensional model;

clipping triangles with sub-regions located within the camera viewport from the plurality of triangles of the three-dimensional model; and removing triangles, bounding boxes of which are not greater than a pixel and do not cover diagonal points of the pixel, from the plurality of triangles of the three-dimensional model.

19. The computer device according to claim 16, wherein the method further comprises:

computing an image difference between a first image rendered by the method and a second image, wherein the second image is obtained by rendering through an off-line renderer;

back propagating the image difference through a gradient of an error function to obtain updated fragment data of the plurality of triangles in a clip space, wherein the error function indicates a process of rendering the fragment data of the plurality of triangles to a two-dimensional image; and updating the first image based on the updated fragment data of the plurality of triangles.

20. A non-transitory computer-readable storage medium, the computer-readable storage medium storing a computer program, and the computer program being loaded and executed by a processor of a computer device and causing the computer device to implement a rasterizing method including:

obtaining primitive data of a plurality of triangles of a three-dimensional model in a three-dimensional space;

performing a first coverage test on the plurality of triangles and a plurality of first blocks of a camera viewport through n thread blocks to obtain first data corresponding to the plurality of first blocks respectively, the first data comprising primitive data of a first triangle cluster that intersects with a respective one of the first blocks, and n being a positive integer;

performing a second coverage test on the first triangle cluster of a first target block among the plurality of first blocks and a plurality of second blocks of the first target block through the n thread blocks based on the first data to obtain second data corresponding to the plurality of second blocks respectively, the second data comprising primitive data of a second triangle cluster that intersects with a respective one of the second blocks, the second triangle cluster being a subset of the first triangle cluster, and the plurality of second blocks are obtained by dividing the first target block;

rendering triangles in the second triangle cluster of a second target block to pixels in the second target block, the second target block being any one of the plurality of second blocks; and allocating a linked list space to the first target block through processing threads in a ith block when a remaining capacity of an allocated first linked list space fails to accommodate indexes of the plurality of triangles determined by the ith block that intersect with the first target block, and determining that the linked list space is a first to-be-processed linked list space, wherein a plurality of threads in the ith block correspond to the plurality of first blocks one to one.

* * * * *